(12) United States Patent
Montgomery et al.

(10) Patent No.: US 8,866,633 B2
(45) Date of Patent: Oct. 21, 2014

(54) SYNCHRONIZATION BETWEEN DEVICES

(71) Applicant: Schlumberger Technology Corporation, Sugar Land, TX (US)

(72) Inventors: Michael Montgomery, Sugar Land, TX (US); Julius Kusuma, Somerville, MA (US); Jean Seydoux, Ipanema (BR); Desheng Zhang, Missouri City, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 13/889,944

(22) Filed: May 8, 2013

(65) Prior Publication Data

US 2013/0251083 A1 Sep. 26, 2013

Related U.S. Application Data

(60) Division of application No. 12/817,355, filed on Jun. 17, 2010, now Pat. No. 8,514,098, which is a continuation-in-part of application No. PCT/US2010/032606, filed on Apr. 27, 2010.

(60) Provisional application No. 61/173,382, filed on Apr. 28, 2009.

(51) Int. Cl.
*G01V 11/00* (2006.01)
*G06F 1/12* (2006.01)

(52) U.S. Cl.
CPC .......... *G01V 11/002* (2013.01); *G01V 2200/12* (2013.01); *G06F 1/12* (2013.01)
USPC ...................... 340/855.4; 340/853.1; 713/400

(58) Field of Classification Search
CPC . G01V 11/00; G01V 11/002; G01V 2200/12; E21B 47/12; E21B 47/122; G06F 1/12
USPC .......... 340/853.1, 855.4, 855.3, 855.7, 854.6, 340/870.25, 870.26; 331/172, 55; 375/354, 375/362, 371, 373, 375, 376, 359
See application file for complete search history.

(56) References Cited

U.S. PATENT DOCUMENTS 4,577,150 A 3/1986 Schreuder
4,600,994 A 7/1986 Hayashi (Continued)

OTHER PUBLICATIONS

International Search Report and Written Opinion issued in PCT/US2010/032606 on Nov. 30, 2010, 8 pages.

*Primary Examiner* — Ryan Johnson
(74) *Attorney, Agent, or Firm* — Kenneth Liu; Jeremy Berman; Kimberly Ballew

(57) ABSTRACT

The present disclosure relates to a method to determine a clock signal when separate clocks are used. In one embodiment, a disciplined clock system comprising an update subsystem and a synthesis subsystem is provided. A first clock phase estimate is provided to the update subsystem and used, along with the update subsystem, to determine a frequency offset estimate and a phase offset estimate. The clock signal is determining using the frequency offset estimate, the phase offset estimate, and the synthesis subsystem. Alternatively, two clocks can be synchronized by generating a signal associated with a first clock; modulating the signal; transmitting the modulated signal; receiving the modulated signal by a receiver associated with a second clock; correlating the received signal; determining the time of arrival of the received signal; determining the time difference between the two clocks; and synchronizing the two clocks.

19 Claims, 18 Drawing Sheets

(56) References Cited

U.S. PATENT DOCUMENTS

| | | |
|---|---|---|
| 4,899,112 A | 2/1990 | Clark et al. |
| 5,999,129 A | 12/1999 | Rose |
| 6,118,745 A | 9/2000 | Hutchins et al. |
| 6,711,230 B1 * | 3/2004 | Nicholls et al. ............... 375/376 |
| 7,292,109 B2 | 11/2007 | Haiut |
| 7,433,435 B2 | 10/2008 | Nagaraja |
| 8,181,057 B2 * | 5/2012 | Nichols et al. ................ 713/401 |
| 8,275,087 B2 * | 9/2012 | Hadzic et al. ................ 375/376 |
| 2002/0022465 A1 * | 2/2002 | McCullagh et al. .......... 455/260 |
| 2005/0035875 A1 * | 2/2005 | Hall et al. ................ 340/853.1 |
| 2006/0056563 A1 * | 3/2006 | Aweya et al. ................ 375/376 |

\* cited by examiner

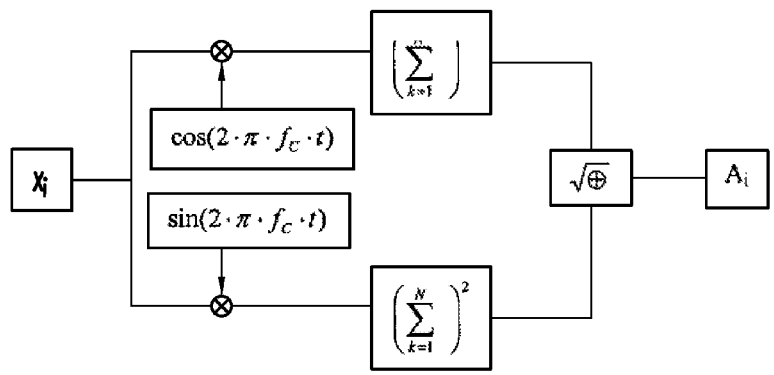

| | |
|---|---|
| $x_i = A \cdot \sin\left(2 \cdot \pi \cdot \frac{f_c}{f_s} \cdot k + \vartheta\right) + N_i$ | INCOMING SIGNAL OF AMPLITUDE A AND NOISE $N_i$ WITH $f_c$ AND $f_s$ AS CARRIER AND SAMPLING FREQUENCIES |
| $X_C = \sum_{k=1}^{n} x_i \cdot \cos\left(2 \cdot \pi \cdot \frac{f_c}{f_s} \cdot k\right)$ | CORRELATED COSINE WINDOW WHERE N IS THE WINDOW LENGTH (5000 SAMPLES AT 500kHz). NOTE THAT EACH xicos($\omega$k) IS COMPUTED AND STORED IN A 5000-SAMPLE LONG CIRCULAR ARRAY. $X_C$ IS THEN CALCULATED AS A RUNNING SUM OVER THAT ARRAY BY ADDING THE NEW PRODUCT AND REMOVING THE PREVIOUS 5000th SAMPLE TO MINIMIZE COMPUTATION LOAD |
| $X_S = \sum_{k=1}^{n} x_i \cdot \sin\left(2 \cdot \pi \cdot \frac{f_c}{f_s} \cdot k\right)$ | CORRELATED SINE WINDOW WHERE N IS THE WINDOW LENGTH (5000 SAMPLES AT 500kHz). NOTE THAT EACH xisin($\omega$k) IS COMPUTED AND STORED IN A 5000-SAMPLE LONG CIRCULAR ARRAY. $X_S$ IS THEN CALCULATED AS A RUNNING SUM OVER THAT ARRAY BY ADDING THE NEW PRODUCT AND REMOVING THE PREVOUS 5000th SAMPLE TO MINIMUZE COMPUTATION LOAD |
| $A_i = \sqrt{X_C^2 + X_S^2}$<br>$i_{max} = i[A_i = \max(A_i)]$<br>$A = A_{i_{max}} \quad TOA = t_w + \frac{i_{max}}{f_s}$ | PHASE INDEPENDENT AMPLITUDE. PULSE AMPLITUDE IS TAKEN AS THE MAXIMUM AMPLITUDE OVER THE WINDOW. TOA (TIME OF ARRIVAL) IS THE SAMPLED TIME WITH RESPECT TO AN ARBITRARY RECEIVER REFERENCE TIME. $t_w$ IS THE WINDOW START TIME wrt TIME REFERENCE. |

*FIG. 9*

SYNCHRONIZATION BETWEEN DEVICES

CROSS-REFERENCE TO OTHER APPLICATIONS

This application is a divisional application of U.S. patent application Ser. No. 12/817,355, filed on Jun. 17, 2010, which is a continuation-in-part of international application number PCT/US2010/032606, filed Apr. 27, 2010, which claims the benefit of U.S. Provisional Application No. 61/173,382, filed Apr. 28, 2009.

BACKGROUND

1. Technical Field

The present disclosure relates generally to the logging of subsurface formations surrounding a wellbore using a downhole logging tool, and particularly to making measurements with a modular logging tool while drilling, and using those measurements to infer one or more formation properties.

2. Background Art

Logging tools have long been used in wellbores to make, for example, formation evaluation measurements to infer properties of the formations surrounding the borehole and the fluids in the formations. Common logging tools include electromagnetic tools, nuclear tools, and nuclear magnetic resonance (NMR) tools, though various other tool types are also used.

Early logging tools were run into a wellbore on a wireline cable, after the wellbore had been drilled. Modern versions of such wireline tools are still used extensively. However, the need for information while drilling the borehole gave rise to measurement-while-drilling (MWD) tools and logging-while-drilling (LWD) tools. MWD tools typically provide drilling parameter information such as weight on the bit, torque, temperature, pressure, direction, and inclination. LWD tools typically provide formation evaluation measurements such as resistivity, porosity, and NMR distributions (e.g., T1 and T2). MWD and LWD tools often have components common to wireline tools (e.g., transmitting and receiving antennas), but MWD and LWD tools must be constructed to not only endure but to operate in the harsh environment of drilling.

Electromagnetic (EM) wave propagation in a medium is characterized by the magnetic permeability of the medium ($\mu$) and the complex dielectric permittivity ($\in^*$) given by, $$\varepsilon^* = \varepsilon_r - i\frac{\sigma}{\varpi\varepsilon_0} \text{ and} \tag{1}$$

$$\mu = \mu_r \mu_0. \tag{2}$$

$\in_r$ and $\mu_r$ are the permittivity and permeability of the medium relative to their corresponding values in free space ($\in_0$=8.8 $10^{-12}$, and $\mu_0$=1/(4$\pi$10$^{-7}$)), $\omega$ is the angular frequency, and $\sigma$ is the conductivity. Those parameters affect the wave vector k, given by, $$k = \frac{\varpi}{c}\sqrt{\mu_r \varepsilon_r} \tag{3}$$

where c, the speed of light in vacuum, is given by, $$c = \frac{1}{\sqrt{\mu_0 \varepsilon_0}}. \tag{4}$$

Most rocks of interest are non-magnetic and therefore $\mu_r$ equals one. An EM measurement from a resistivity logging tool is related to k, which in turn is related to $\in_r$ and $\sigma$. The real and imaginary parts of $\in^*$ have different frequency dependencies. For example, the conductivity is typically constant until the frequency is above about 1 MHz, after which it increases slowly. The permittivity of rocks, on the other hand is very large (e.g., ~10$^9$) at sub-Hz frequencies, and decreases as the frequency increases, but eventually flattens out at frequencies around a GHz. The frequency dependence of permittivity is 1/f for frequencies up to approximately 10$^4$ Hz, but between 10$^4$ and 10$^8$ Hz, it varies as 1/(f$^\alpha$), where CC is approximately 0.3. Since the imaginary part of $\in^*$ has an explicit 1/f dependence, the imaginary part dominates at low frequency and the real part dominates at high frequencies.

Most prior art low frequency resistivity tools have concentrated on the conductivity term of the complex permittivity and ignored the real part (which is known as the dielectric constant). As such, those tools only measure the amplitude of the received signal, which is sufficient to solve for the conductivity. However, if the phase of the received signal is also measured, one can additionally solve for the real and imaginary part of the complex permittivity. There is increasingly more interest in the dielectric constant since it contains information on the micro-geometry of the rock matrix.

Physics-based models explaining the frequency dependence of permittivity (and specifically the dielectric constant) attribute the variation with frequency to three effects, each of which operates in a particular frequency range. At high frequencies, where the permittivity is essentially frequency independent, the permittivity of the rock, which is a mixture of the solid matrix, water, and hydrocarbons, can be calculated using the "complex refractive index method" (CRIM), shown by Equation (5) below, $$\sqrt{\in_{rock}^*} = (1-\phi)\sqrt{\in_{matrix}} + S_{water}\phi\sqrt{\in_{Water}^*} + (1-S_{water})\phi\sqrt{\in_{hydrocarbon}}. \tag{5}$$

This is a simple volumetric average of the refractive index (that is, the square root of the permittivity) of the components. Any slight frequency dependence in this range is the result of the frequency dependence of the water permittivity.

The intermediate range, where the permittivity varies as the ($-\alpha$) power of frequency, is attributed to the geometrical shape of the rock grains. The insulating grains, surrounded by conductive water, form local capacitors that respond to the applied electric field. The permittivity in this range has been described by several models, one of which, for a fully water-filled rock, is given by, $$\phi = \left(\frac{\varepsilon_{rock}^* - \varepsilon_{matrix}}{\varepsilon_{water}^* - \varepsilon_{matrix}}\right)\left(\frac{\varepsilon_{water}^*}{\varepsilon_{rock}^*}\right)^L \tag{6}$$

where L is the depolarizing factor describing the average grain shape. For example, L is ⅓ for spherical grains, and it deviates for more realistic, spheroidal grain shapes, though it remains between 0 and 1. This equation can be easily modified to include partial water saturation and the effect of hydrocarbons on the measured complex permittivity. As mentioned above, the intermediate frequency range starts at approximately 100 kHz, which is the operating frequency of most propagation and induction tools, so this expression is very applicable to the measurements from these tools and leads to a complex permittivity of water from which water salinity can be determined. The expression also provides a measure of grain shape that has further application.

At frequencies below 100 kHz, the permittivity has a 1/f dependence. This is attributed to the double layer effects caused by surface charges on the surfaces of the rock grains. The surfaces of the rock grains are charged either by the nature of the minerals at the surface, or, more importantly, by the varying amounts of clay mineral at the surface. These minerals have surface charges in contact with a cloud of oppositely charged counter-ions, forming an ionic double layer. The counter-ions respond to the applied electric field and cause a large permittivity. The permittivity in this frequency range is a clay indicator and can be used to estimate the clay concentration or cation-exchange capacity (CEC). Thus, any resistivity tool that measures the amplitude and phase of the received signal below 100 kHz can determine the conductivity and permittivity of the rock and can provide an estimate of the shale content. In addition to shale estimation, phase measurement may be used to determine a phase conductivity in addition to the traditionally measured amplitude conductivity. It has been shown that those two responses have different depths of investigations, and their combination provides a very good bed boundary indicator.

SUMMARY

The present disclosure relates to a method to determine the phase of a signal when transmitter and receiver circuits use separate clocks. A discrepancy between the separate clocks is determined, as is a correction factor between the separate clocks. The phase is determined using a measured time of arrival of the signal, the determined discrepancy, and the determined correction factor. A drift factor and an expected start time of a pulse sequence may be used to determine the discrepancy. A start time of a pulse within the pulse sequence is determined and used to determine the correction factor. The method works by either absolute synchronization of the separate clocks, or by making the measurements independent of clock synchronization.

The present disclosure further relates to a method to determine a clock signal when separate clocks are used. In one embodiment, a disciplined clock system comprising an update subsystem and a synthesis subsystem is provided. A first clock phase estimate is provided to the update subsystem and used, along with the update subsystem, to determine a frequency offset estimate and a phase offset estimate. The clock signal is determining using the frequency offset estimate, the phase offset estimate, and the synthesis subsystem. Alternatively, two clocks can be synchronized by generating a signal associated with a first clock; modulating the signal; transmitting the modulated signal; receiving the modulated signal by a receiver associated with a second clock; correlating the received signal; determining the time of arrival of the received signal; determining the time difference between the two clocks; and synchronizing the two clocks.

Other aspects and advantages will become apparent from the following description and the attached claims.

BRIEF DESCRIPTION OF THE FIGURES

FIG. 9 shows a coarse processing flow beginning with an incoming signal and resulting in a phase independent amplitude output, in accordance with one embodiment in the present disclosure.

DETAILED DESCRIPTION

Some embodiments will now be described with reference to the figures Like elements in the various figures will be referenced with like numbers for consistency. In the following description, numerous details are set forth to provide an understanding of various embodiments and/or features. However, it will be understood by those skilled in the art that some embodiments may be practiced without many of these details and that numerous variations or modifications from the described embodiments are possible. As used here, the terms "above" and "below", "up" and "down", "upper" and "lower", "upwardly" and "downwardly", and other like terms indicating relative positions above or below a given point or element are used in this description to more clearly describe certain embodiments. However, when applied to equipment and methods for use in wells that are deviated or horizontal, such terms may refer to a left to right, right to left, or diagonal relationship as appropriate.

Figure 1:
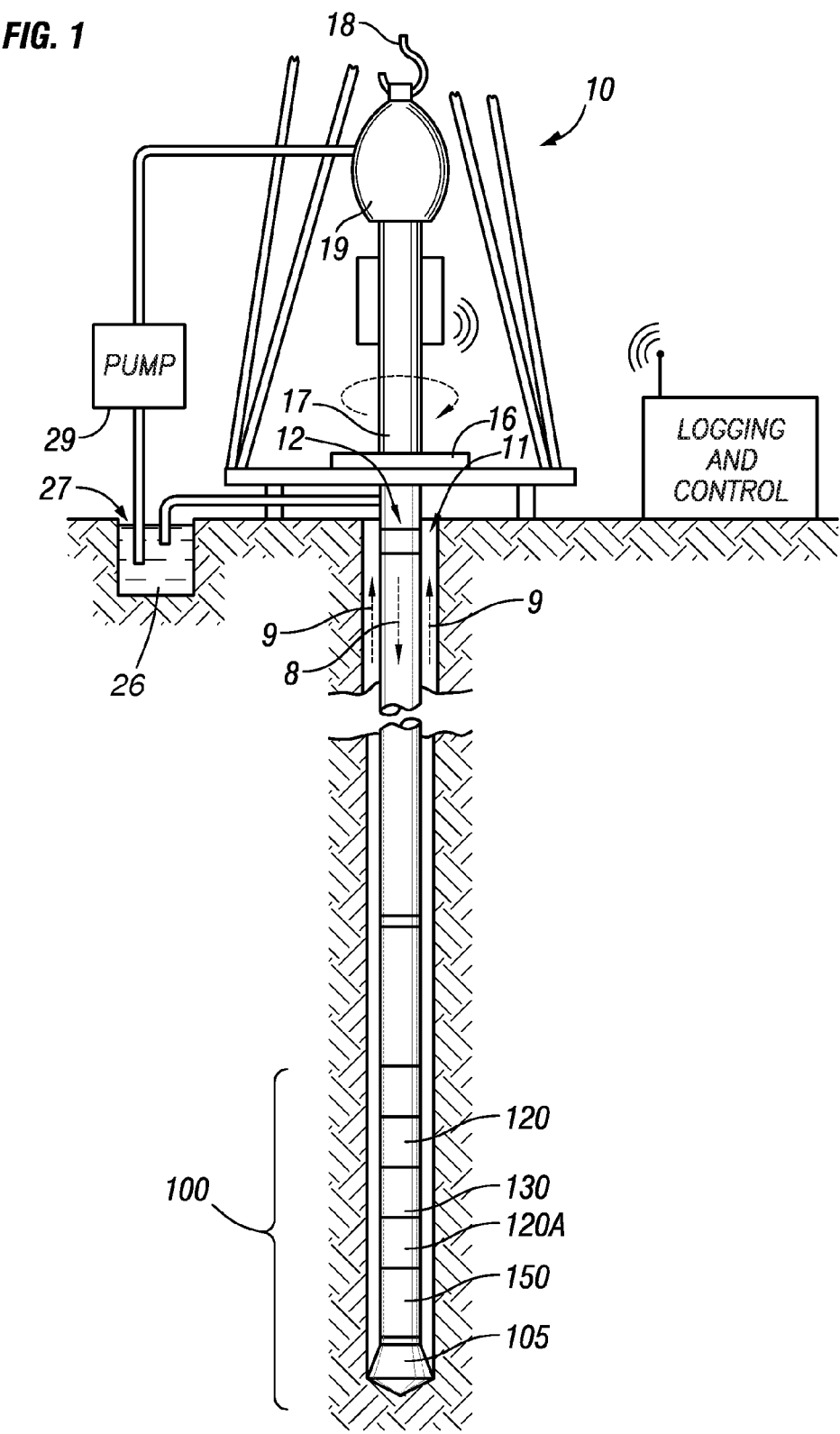
FIG. 1 illustrates an exemplary well site system.

FIG. 1 illustrates a well site system in which various embodiments can be employed. The well site can be onshore or offshore. In this exemplary system, a borehole 11 is formed in subsurface formations by rotary drilling in a manner that is well known. Some embodiments can also use directional drilling, as will be described hereinafter.

A drill string 12 is suspended within the borehole 11 and has a bottom hole assembly 100 which includes a drill bit 105 at its lower end. The surface system includes platform and derrick assembly 10 positioned over the borehole 11, the assembly 10 including a rotary table 16, kelly 17, hook 18 and rotary swivel 19. The drill string 12 is rotated by the rotary table 16, energized by means not shown, which engages the kelly 17 at the upper end of the drill string. The drill string 12 is suspended from a hook 18, attached to a traveling block (also not shown), through the kelly 17 and a rotary swivel 19 which permits rotation of the drill string relative to the hook. As is well known, a top drive system could alternatively be used.

In the example of this embodiment, the surface system further includes drilling fluid or mud 26 stored in a pit 27 formed at the well site. A pump 29 delivers the drilling fluid 26 to the interior of the drill string 12 via a port in the swivel 19, causing the drilling fluid to flow downwardly through the drill string 12 as indicated by the directional arrow 8. The drilling fluid exits the drill string 12 via ports in the drill bit 105, and then circulates upwardly through the annulus region between the outside of the drill string and the wall of the borehole, as indicated by the directional arrows 9. In this well known manner, the drilling fluid lubricates the drill bit 105 and carries formation cuttings up to the surface as it is returned to the pit 27 for recirculation.

The bottom hole assembly 100 of the illustrated embodiment includes a logging-while-drilling (LWD) module 120, a measuring-while-drilling (MWD) module 130, a roto-steerable system and motor, and drill bit 105.

The LWD module 120 is housed in a special type of drill collar, as is known in the art, and can contain one or a plurality of known types of logging tools. It will also be understood that more than one LWD and/or MWD module can be employed, e.g. as represented at 120A. (References, throughout, to a module at the position of 120 can alternatively mean a module at the position of 120A as well.) The LWD module includes capabilities for measuring, processing, and storing information, as well as for communicating with the surface equipment. In the present embodiment, the LWD module includes a resistivity measuring device.

The MWD module 130 is also housed in a special type of drill collar, as is known in the art, and can contain one or more devices for measuring characteristics of the drill string and drill bit. The MWD tool further includes an apparatus (not shown) for generating electrical power to the downhole system. This may typically include a mud turbine generator powered by the flow of the drilling fluid, it being understood that other power and/or battery systems may be employed. In the present embodiment, the MWD module includes one or more of the following types of measuring devices: a weight-on-bit measuring device, a torque measuring device, a vibration measuring device, a shock measuring device, a stick/slip measuring device, a direction measuring device, and an inclination measuring device.

Figure 2:
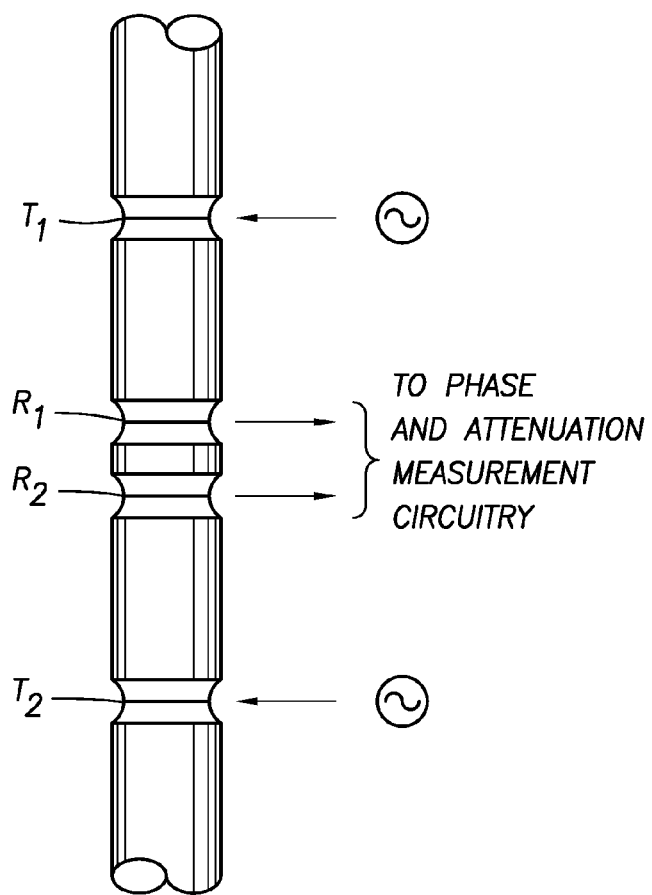
FIG. 2 shows a prior art electromagnetic logging tool.

An example of a tool which can be the LWD tool 120, or can be a part of an LWD tool suite 120A of the system and method hereof, is the dual resistivity LWD tool disclosed in U.S. Pat. No. 4,899,112 and entitled "Well Logging Apparatus And Method For Determining formation Resistivity At A Shallow And A Deep Depth," incorporated herein by reference. As seen in FIG. 2, upper and lower transmitting antennas, $T_1$ and $T_2$, have upper and lower receiving antennas, $R_1$ and $R_2$, therebetween. The antennas are formed in recesses in a modified drill collar and mounted in insulating material. The phase shift of electromagnetic energy as between the receivers provides an indication of formation resistivity at a relatively shallow depth of investigation, and the attenuation of electromagnetic energy as between the receivers provides an indication of formation resistivity at a relatively deep depth of investigation. The above-referenced U.S. Pat. No. 4,899,112 can be referred to for further details. In operation, attenuation-representative signals and phase-representative signals are coupled to a processor, an output of which is coupleable to a telemetry circuit.

Recent electromagnetic logging tools use one or more tilted or transverse antennas, with or without axial antennas. Those antennas may be transmitters or receivers. A tilted antenna is one whose dipole moment is neither parallel nor perpendicular to the longitudinal axis of the tool. A transverse antenna is one whose dipole moment is perpendicular to the longitudinal axis of the tool, and an axial antenna is one whose dipole moment is parallel to the longitudinal axis of the tool. Two antennas are said to have equal angles if their dipole moment vectors intersect the tool's longitudinal axis at the same angle. For example, two tilted antennas have the same tilt angle if their dipole moment vectors, having their tails conceptually fixed to a point on the tool's longitudinal axis, lie on the surface of a right circular cone centered on the tool's longitudinal axis and having its vertex at that reference point. Transverse antennas obviously have equal angles of 90 degrees, and that is true regardless of their azimuthal orientations relative to the tool.

The phase of a received signal wherein the transmitter and receiver circuits use their own separate clocks can be measured either by absolute synchronization of the two clocks, or by making the measurements independent of the clock synchronization.

Conventional resistivity tools use a single clock in the tool to sample and record the time when the transmitter antenna is energized and when the associated wave is received by the receiver antenna. Since the time interval between the transmitting and receiving event is the parameter of interest, the clock does not have to be synchronized with any other clock. The measurement is a time difference measurement and, as such, so long as the clock does not drift during the time period when these two events take place, there is no error due to clock discrepancy.

Figure 3:
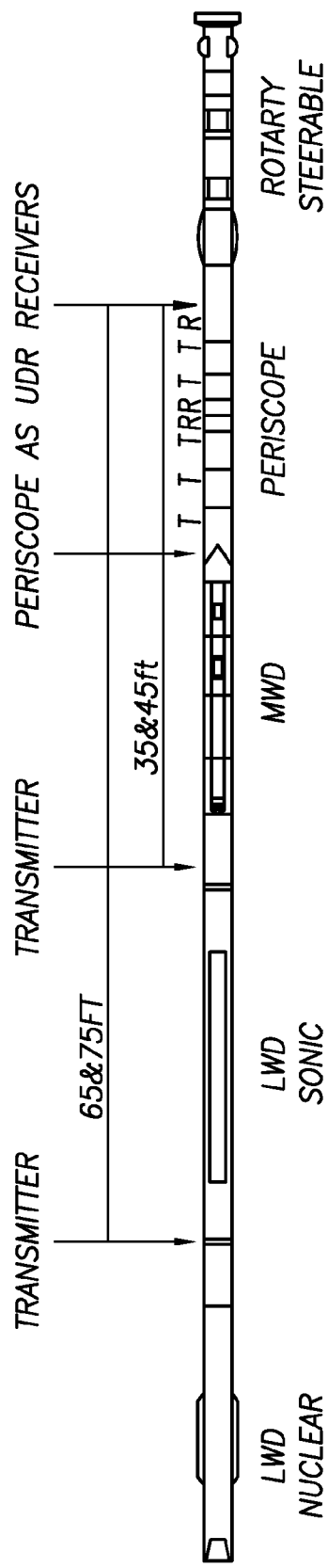
FIG. 3 is a schematic drawing of a typical modular resistivity tool with exemplary transmitter and receiver spacings, in accordance with one embodiment in the present disclosure.

Modular resistivity tools have been proposed wherein different antennas are located in different modules. These modules can be placed at different places within a bottomhole assembly (BHA), creating a desired transmitter-receiver (T-R) spacing and radial depth of investigation. Other LWD or MWD tools can occupy the space between the modules so that the space is not wasted. FIG. 3 shows an exemplary BHA containing a modular resistivity tool.

Specifically, FIG. 3 shows an arrangement of three modules in a BHA. The BHA contains a drill bit, followed by a rotary steerable sub that makes directional drilling possible. In this example, the first sub (PERISCOPE tool) is located immediately above the rotary steerable sub, but in general the locations of different modules can be different from one BHA to another. To create space between the first module and the second (Transmitter #2), an MWD sub has been used. The MWD sub serves as a spacer but also performs its own functions. If the desired distance between the modules can not be filled with an existing LWD tool, sections of drill pipe with no particular functionality can be used to achieve the desired distance. The length of BHA between the second module and the third module (Transmitter #1) is filled using an LWD sonic sub in this example. Thus, the resistivity tool in this example is made up of three modules separated by two LWD tools. The tool is located above the rotary steerable sub as shown in FIG. 3. With separate modules it is possible to choose different T-R spacing and thus different radial depths of investigations.

Since each module preferably has its own clock, the modular tool design introduces the clock synchronization and drift problems. The transmitter (TX) module and receiver (RX) module work independently, and the time of the transmitting and receiving events is usually measured by two different clocks. Although these clocks can be set to be equal before sending the tool into the borehole, the clocks have intrinsically different rates, and if left alone, the clocks will not measure the same time at a later point. In addition, downhole temperature changes can affect these clocks differently, and, since certain modules may be separated by, say, 100 ft from other modules, the clocks in the separate modules may be exposed to different local temperatures, causing another source of error.

Consider two different electronic circuits, one using a clock that we shall call "master", M, and the other using a different clock called "local", L. "M" or "L" may also be used herein to indicate or include the respective circuitry associated with the master clock, M, or local clock, L. In general, there may be multiple modules operating, and synchronization is generally needed between all modules involved in a measurement. In the embodiments described below, only two modules are used, but the method is easily extendable to as many modules as desired.

Figure 4:
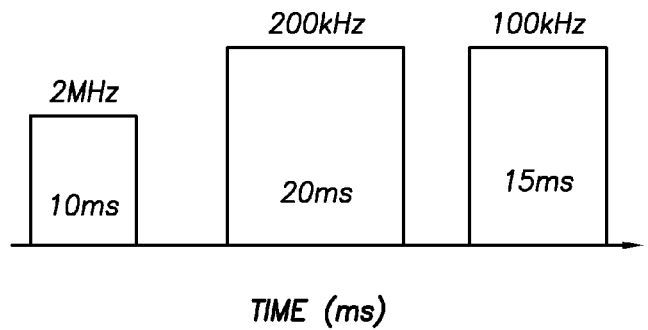
FIG. 4 shows an exemplary sequence with three frequencies, different pulse widths, and time between pulses, in accordance with one embodiment in the present disclosure.

For simplicity, assume the clock in the receiver circuit is the master, though it does not matter whether the RX or TX clock is designated as the master clock. Further consider a sequence of transmission events from the transmitter antenna. This sequence may be a preset list of pulses transmitted by the TX antenna into the formation, the sequence may have pulses of different frequency and duration, and the time between pulses may be different. An exemplary sequence for an EM logging tool is shown in FIG. 4. The transmitter may be programmed to transmit a sequence such as one shown in FIG. 4 in a repetitious fashion.

One implementation to correct the clock drift works by M sending a synchronizing pulse to start an initiating cycle. This signal is typically sent along a conductive pathway through the BHA that serves as a communication link, often referred to as a "bus". As the bus length increases, for example, with increased module spacing, the variation in the time of propagation of the synchronizing signal may become non-negligible. This variation in propagation time must be taken into account to make accurate phase measurements.

An alternative way to send the synchronizing signal is as a transmitted wave passing through the formation. This involves, for example, transmitting various signals at a given frequency for some desired time. Alternatively, some of the pulses used for sampling the formation can be used as synchronization pulses. However, the formation signal propagation time can vary and that variation must be accounted for or minimized. The effect of the formation on the propagation time is typically less than 100 ns, and if the separation between synchronization pulses is chosen to be on the order of seconds, the effect of the formation variation will be negligible. Thus, the clock frequency correction estimate can be made arbitrarily better by increasing the time between observed synchronization signals. The particular amount of time depends on the acceptable tolerance. A local clock measures the time difference between the transmitted signals and uses a priori knowledge of the timing between those transmissions (i.e., transmission sequence timing) to compute a correction factor that is accurate to within the propagation uncertainty over the interval between the received signals. Uncertainty in the formation signal propagation time is due in part to changes along the wellbore (i.e., measured depth) and changes around the wellbore (i.e., tool rotation angle). The uncertainty caused by rotation can be reduced by limiting consideration to only those signals that are acquired at the same, or nearly the same, tool rotation angle. Comparing the elapsed time between like-positioned samples measured by the local clock with the interval time between the samples according to the transmission sequence timing allows a clock frequency correction to be computed.

Figure 5:
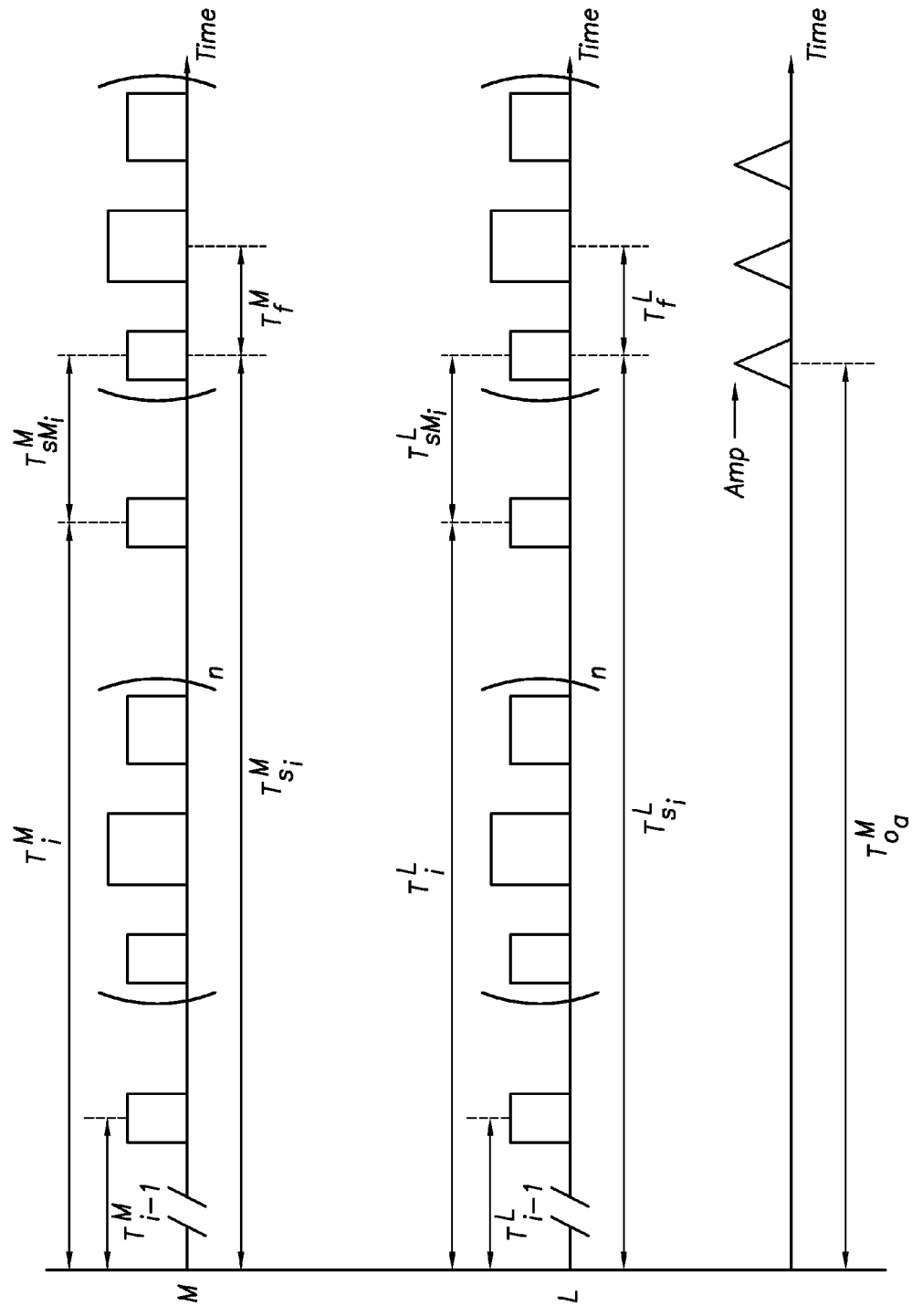
FIG. 5 illustrates various specific times and time intervals and how they relate to one another, in accordance with one embodiment in the present disclosure.

For the present invention, either method of sending the synchronizing pulse or signal may be used. The time between two adjacent synchronization pulses as measured by M, for example, is $(T^M_i - T^M_{i-1})$ and can be as short as the duration of one sequence, but typically is longer than the duration of a few sequences (see FIG. 5). Note that we use a superscript to specify which clock has made the measurement. The synchronizing pulses are measured by both the M and L clocks. In each case the measurement is made by the clock in the measuring circuit. Once M measures $T^M_i$, it broadcasts that value and L receives that information. L proceeds to calculate $\Delta M^M = T^M_i - T^M_{i-1}$ using the information provided, and also calculates $\Delta L^L$ from its own measurements of the same two pulses. If one clock is faster than the other, $\Delta M^M$ and $\Delta L^L$ will be different and the correction factor, $K_{ppb}$, will be different from zero, $$K_{ppb} = 1 - \frac{\Delta L^L}{\Delta M^M}. \tag{7}$$

Note that $K_{ppb}$ depends on the time difference between synchronizing pulses and is independent of the absolute time reading of either clock. Also, $K_{ppb}$ is greater than zero if L is slower than M. L also calculates the expected times for starting the next sequence by the two clocks, namely $T^L_{si}$ and $T^M_{si}$, as shown schematically in FIG. 5. Those values relative to the synchronization pulse will be, $$T_{SLi}^L = T_{Si}^L - T_i^L \text{ and} \tag{8}$$

$$T_{SMi}^M = T_{Si}^M - T_i^M. \tag{9}$$

More detailed description of how those quantities are calculated is described below. For simplicity, clock drifts are assumed to be close to constant between synchronization pulses, which allows for easy derivations. Nonetheless, if necessary, more advance filtering can be implemented through the use of past time differences of synchronization pulses. In the next step, the start sequence time measured by L is calculated with respect to M, $$T_{SLi}^M = \frac{T_{SLi}^L}{1 - K_{ppb}}. \tag{10}$$

Having start sequence times for both clocks relative to M, they can be subtracted to calculate the discrepancy between the two clocks relative to M, $$\Delta_i^M = T_{SMi}^M - T_{SLi}^M. \tag{11}$$

This error accounts for the lack of synchronization between the two clocks and L sends this value to M. At this point, M can use $K_{ppb}$ as calculated before, or preferably, M may interpolate an updated value for $K_{ppb}$ using information from the previous cycle, $$K_{ppb} = -\frac{(\Delta_i^M - \Delta_{i-1}^M)}{(T_{Si}^M - T_{Si-1}^M) - (\Delta_i^M - \Delta_{i-1}^M)}. \tag{12}$$

The starting time of one of the pulses within the sequence relative to the start time of the sequence is $T_f$. This parameter, if measured by L and transformed in reference to M, is, $$(T_f^L)^M = \frac{T_f^L}{1 - K_{ppb}}. \tag{13}$$

The difference as calculated below is the correction for a pulse within the sequence, $$\Delta T_f^M = T_f^M - (T_f^L)^M. \tag{14}$$

Having this correction, one may calculate the phase by, $$\varphi = [(Toa^M + \Delta T_f^M + \Delta_i^M)\%(1/f)]2\pi f \tag{15}$$

where we use the "%" notation for the modulo or modulus operator, and $Toa^M$ is the measured time of arrival, as measured by M.

Figure 6:
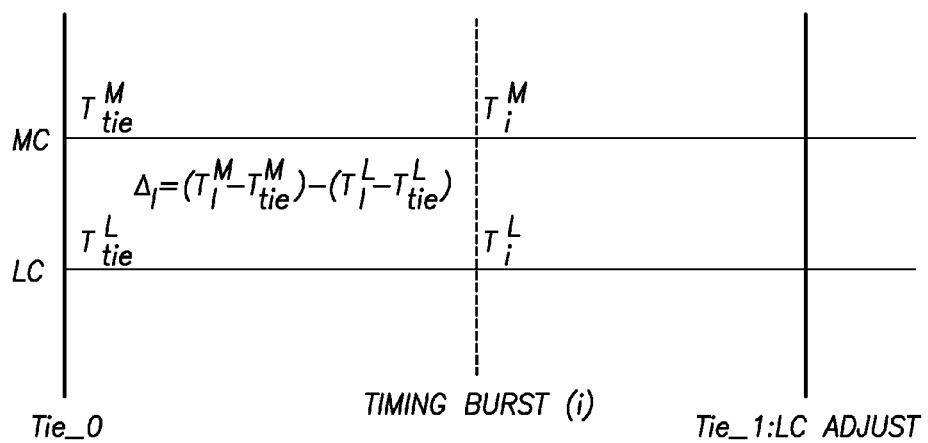
FIG. 6 illustrates how to synchronize the subs with the master clock, in accordance with one embodiment in the present disclosure.

The acquisition sequence of each sub has to be synchronized to avoid any potential conflict. All subs have to synchronize with the master clock. A local clock may drift slightly relative to the master clock, however, it should be readjusted once the drift exceeds a prescribed threshold. Every timing signal provides the actual clock difference between the master clock and the local clock. Let $T_i^L$ and $T_i^M$ be the TOA of a timing signal, i, in local clock and master clock, respectively. We can establish a "tie" point as shown in FIG. 6. At the particular instant of a tie point, the local clock and the master clock are synchronized. After power up, the first timing signal exchange leads to the measurement of $T_{tie}^M$ and $T_{tie}^L$, and adjusting the local clock by $(T_{tie}^M - T_{tie}^L)$ establishes the first tie point, Tie_0. Note the clock adjustment may not be an actual hardware adjustment, but rather can be a correction factor that is computed and used in subsequent calculations.

Using the tie point, we can calculate the difference between the master clock and the local clock for any subsequent timing signal by referencing to the tie point, $$\Delta_i = (T_i^M - T_{tie}^M) - (T_i^L - T_{tie}^L). \tag{16}$$

For small values of $\Delta_i$, no correction is needed, but as these clock discrepancies increase, a new clock correction is needed. Whether a correction is needed is decided by comparing $\Delta_i$ with a preset value $\Delta_{adj\_threshold}$, where the latter is decided by the user based on the frequency of operation and the width of the excitation and receiver windows. This parameter should be long enough to minimize the number of clock adjustments, yet short enough that the signal falls within the receiver acquisition window. Let $\Delta_{adj\_i}$ be the required local clock adjustment at each timing signal exchange. Then, $$\begin{cases} \text{if} & \Delta_i < -\Delta_{adj\_threshold}, \Delta_{adj\_i} = -\Delta_{adj\_threshold} \\ \text{elseif} & \Delta_i > \Delta_{adj\_threshold}, \Delta_{adj\_i} = \Delta_{adj\_threshold} \\ \text{otherwise,} & \Delta_{adj\_i} = 0. \end{cases} \tag{17}$$

After a clock adjustment is made, we have a new tie point. Let $D_i$ be the actual amount of adjustment needed by a local clock to stay in sync with the master clock at each timing signal exchange. $D_i$ is calculated by, $$D_i = D_{i-1} + \Delta_{adj\_i}$$

if $D_i \geq 0$, $D_i = D_i \% TCT_{length}$ if $D_i < 0$, $D_i = TCT_{length} - (-D_i \% TCT_{length})$ \tag{18} where $TCT_{length}$ is the duration of one complete TCT (tool control table) acquisition cycle. Then, we can calculate the next acquisition sequence starting time by, $$T_{si}^L = (T_i^L + D_i + TCT_{length}) - (T_i^L + D_i + TCT_{length}) \% TCT_{length} - D_i. \tag{19}$$

In normal operations, the transmitter pulses are sent as a sequence with a preset pulse width T (typically 10 ms). The receiver uses a longer receiver sampling window, T+ΔT, (typically 20 ms), to capture the signal as it arrives at the receiver antenna. The measurements are performed by transmitting a series of sequential, multi-frequency, single-tone pulses. For each pulse received, the pulse amplitude and time of arrival (TOA) are determined using a matched filter technique. The time of arrival with respect to an arbitrary time reference in the receiver is converted to a phase measurement. The amplitude and phase can be further processed.

Figure 7:
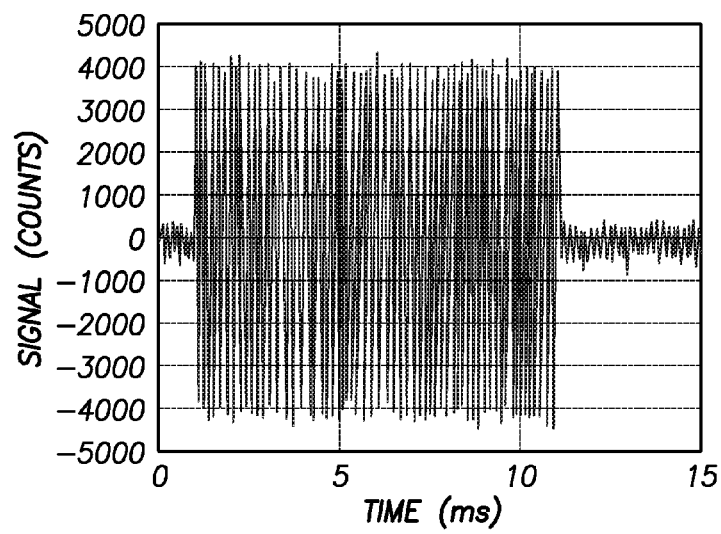
FIG. 7 shows a simulated received pulse after it has been transmitted through a formation, in accordance with one embodiment in the present disclosure.

In ideal conditions (i.e., when the clocks in the two modules are perfectly synchronized), the receiver sampling window is centered over the received signal. In practice, with transmitter/receiver synchronization to within $\Delta_{adj\_threshold}$, each received 10 ms pulse is acquired through a 20 ms window, and is over-sampled before being transferred to memory. By over-sampling, the receiver analog electronics is kept to a minimum (pre-amplifying section plus a low pass anti-aliasing filter), and the measurement processing is then fully digital, allowing flexibility in algorithm development and implementation. FIG. 7 shows a simulated received pulse after it has been transmitted through a formation. This is a pure tone carrier modulated by a square window. Other pulses with wider bandwidth can be also used, such as a pure tone convolved with a pseudorandom number (PN) sequence in order to be more resilient to coherent noise.

Figure 8:
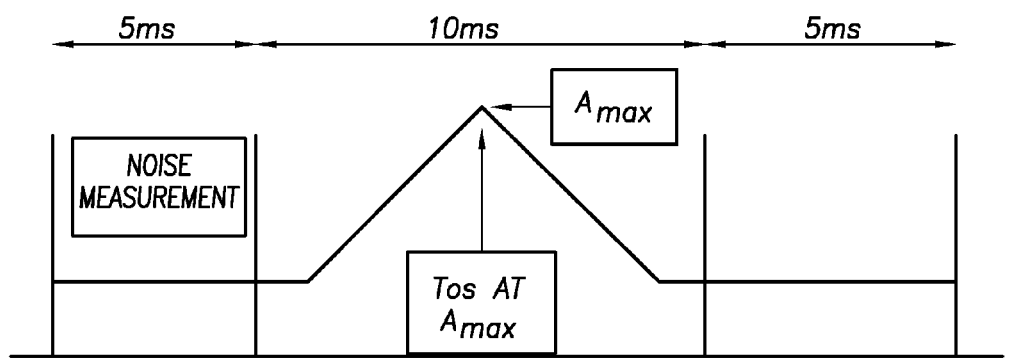
FIG. 8 shows the result of coarse processing when the pulse of FIG. 7 is match filtered.

When the pulse of FIG. 7 is match filtered, the signal of FIG. 8 is obtained. As FIG. 8 shows, noise measurement may be performed immediately after pulse acquisition. The signal of FIG. 8 is the result of coarse processing, which is described below. Once the pulse waveform is acquired, cross-correlations with sliding 10 ms sine and cosine reference arrays are applied to the received signal to determine the amplitude and TOA to within the sampling time accuracy (coarse processing). Application of a matched filter provides the best signal-to-noise ratio (SNR). The processing diagram with the formulas used is shown in FIG. 9. The result from processing a simulated square window 100 kHz pulse is a typical demodulation triangle. For coarse processing, nominal carrier frequencies are preferably chosen so that the reference cosine and sine functions can be stored in tables of minimum size. Another broadband synchronization pulse would give a sharper cross-correlation and could enhance the coarse estimation.

Once a coarse estimation has been made, an accurate determination of the TOA and amplitude may be performed using an accurate measurement of the clock discrepancy factor. The processing is similar to the coarse processing except that now a time-reversed signal corresponding to a matched filter is moved at the carrier frequency as seen by the receiver. The received signal will be seen as a signal with a shifted carrier frequency, as is evident from the formula below (corresponding to a square window modulated sine wave), with $\Phi$ taken as the offset of the pulse waveform within one sampling time difference, $$x_i = A \cdot \sin\left(2 \cdot \pi \cdot \frac{f_c}{f_s} \cdot (1 + K_{ppm} \cdot 10^{-6}) \cdot k + \Phi\right) + N_i. \quad (20)$$

The fine TOA is estimated by first applying a Blackman (tapered) window around the received signal to remove the edge effect. The processing will then filter the synchronization signal with the analytic representation of the impulse response of the matched filter. For the case of the square window modulated with a sine wave, that will be a sine and cosine. The optimum location of the peak maximum is estimated to within one sampling time. At the maximum, the optimum TOA with accuracy better than the sampling time is obtained using, $$TOA_{fine} = \left(\frac{\Phi}{2\pi}\right) \cdot \frac{1}{f_C \cdot (1 + K_{ppm} \cdot 10^{-6})} \quad (21)$$

$$\tan((\Phi)) = \frac{\sum_{k=1}^{N} x_k \cdot \cos(\omega \cdot k)}{\sum_{k=1}^{N} x_k \cdot \sin(\omega \cdot k)} \text{ and } \omega = 2 \cdot \pi \cdot \frac{f_c}{f_s} \cdot (1 + K_{ppm} \cdot 10^{-6}). \quad (22)$$

Figure 10:
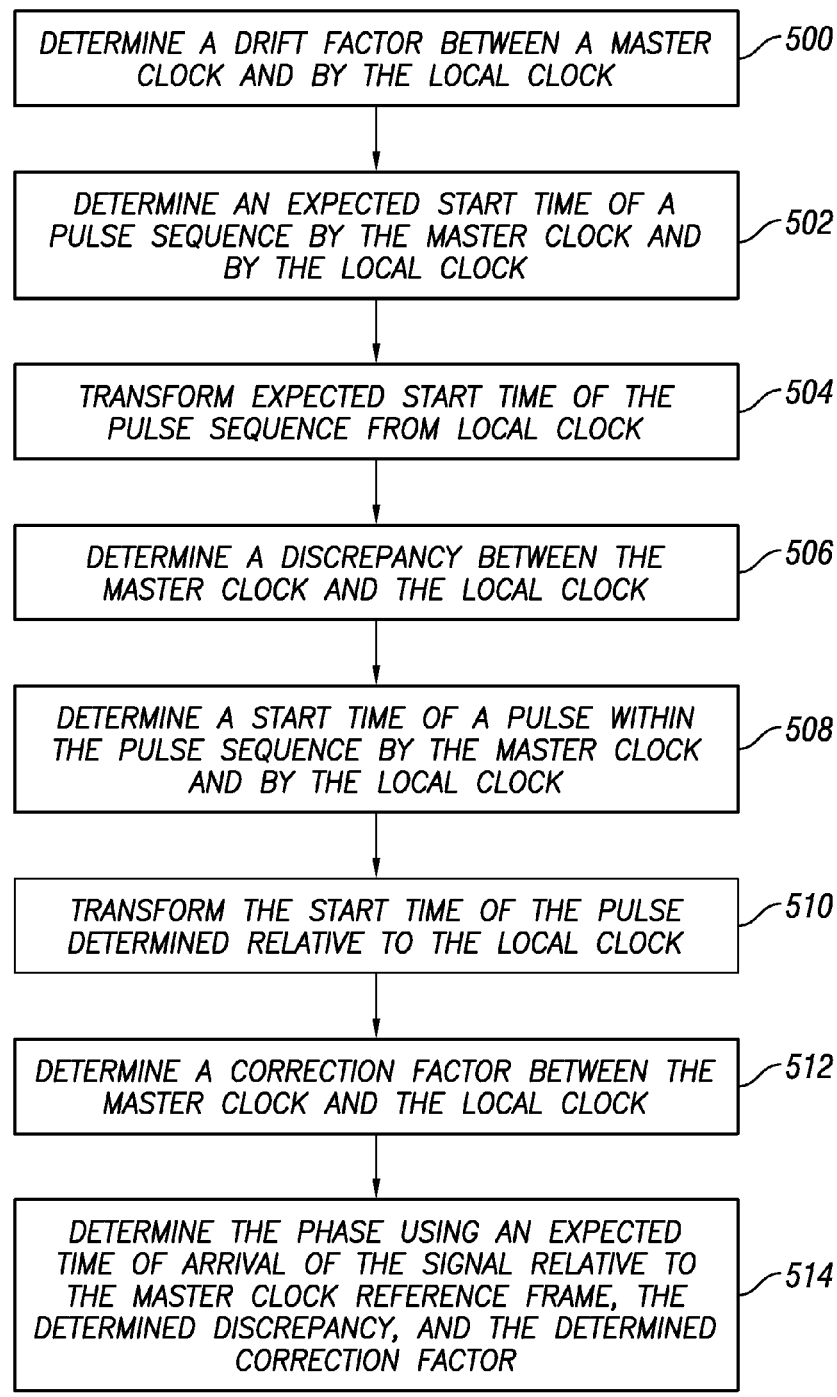
FIG. 10 is a flowchart showing the steps taken in a specific embodiment, in accordance with the present disclosure.

FIG. 10 shows steps in an exemplary embodiment to determine the phase of a signal when transmitter and receiver circuits use separate clocks. The steps comprise determining a drift factor between a master clock, measuring relative to a master clock reference frame, and a local clock, measuring relative to a local clock reference frame (step 500); determining an expected start time of a pulse sequence by the master clock, relative to the master clock reference frame, and by the local clock, relative to the local clock reference frame (step 502); transforming the expected start time of the pulse sequence determined relative to the local clock reference frame to the master clock reference frame using the drift factor (step 504); determining a discrepancy between the master clock and the local clock using the expected start time of the pulse sequence determined by the master clock and the transformed expected start time of the pulse sequence from the local clock (step 506); determining a start time of a pulse within the pulse sequence by the master clock, relative to the master clock reference frame, and by the local clock, relative to the local clock reference frame (step 508); transforming the start time of the pulse determined relative to the local clock reference frame to the master clock reference frame using the drift factor (step 510); determining a correction factor between the master clock and the local clock using the start time of the pulse determined by the master clock and the transformed start time of the pulse from the local clock (step 512); and determining the phase using an expected time of arrival of the signal relative to the master clock reference frame, the determined discrepancy, and the determined correction factor (step 514).

Figure 11:
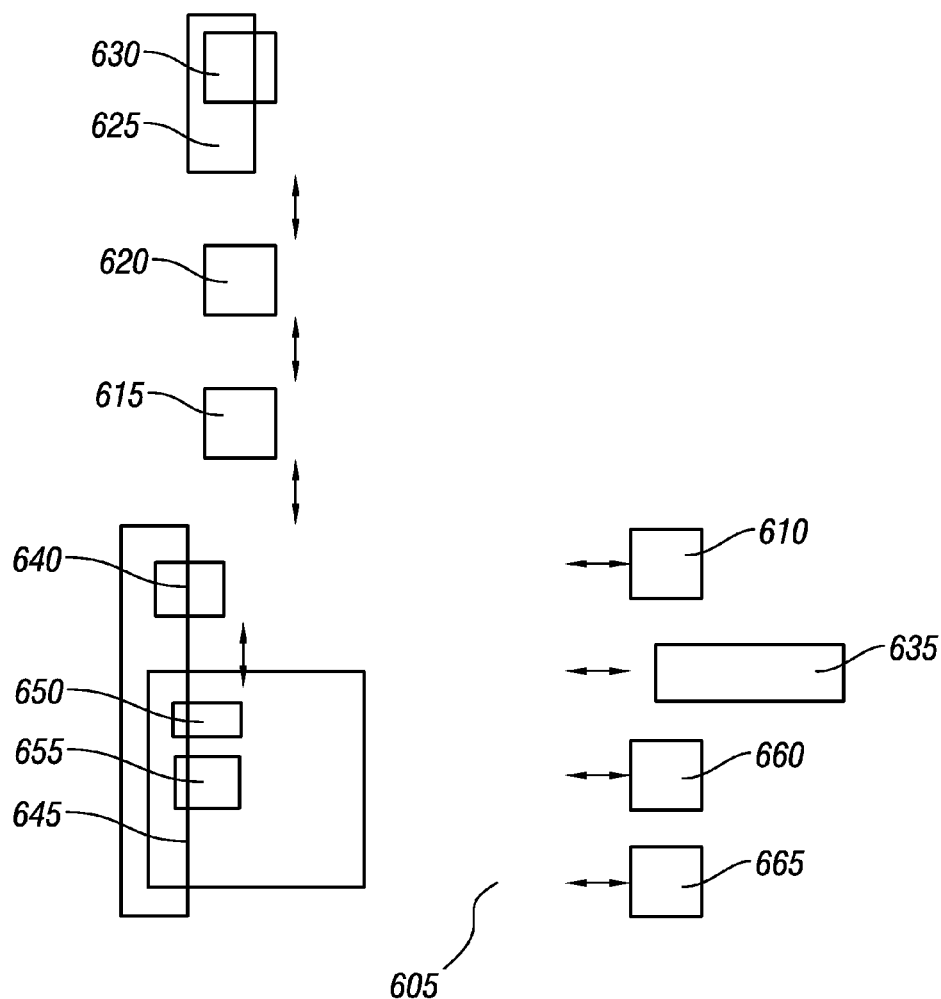
FIG. 11 schematically represents a first implementation method of a device, in accordance with the present disclosure.

FIG. 11 shows a local terminal 605 equipped with a printer 610, a means of capturing physical quantities 635, and a means of access 615 to a network 620 to which a server 625 is connected. The server 625 may be furnished with a database 630.

The local terminal 605 is, for example, a commonly used computer. The means of access 615 to the network 620 is, for example, a modem of a known type permitting access to the network 620, for example the internet. The server 625 is of a known type. The terminal 605 contains software that, when run, implements the steps in the process according to this disclosure. Alternatively, the terminal 605 does not contain specific software but implements a web browser and a web service contained in the server 625.

The terminal 605 may comprise a microprocessor 640 and memory unit 645 containing an operating system 650 and application software 655 containing instructions to implement the process according to this disclosure. Further, in a known manner, the local terminal 605 is equipped with a display screen 660 and means of control 665, for example, a keyboard and a mouse.

The use of two or more tools within a bottomhole assembly may require a coordination of operations to either prevent or assure simultaneous operations. For example, it may be desired that one tool be operated some desired time after the onset or completion of operations by another tool. That is, a function onset time (meaning, broadly, some particular phase of the operation, e.g., onset, end, peak transmission, etc.) for one tool may be specified relative to a function onset time of another tool. Other delay schemes are also possible. For simultaneous operations, the delay is set to zero or the function onset times are equal. Getting the tools to operate with the desired temporal spacing can be problematic if the tools use separate clocks. However, by determining the discrepancy and the correction factor between the separate clocks, as described above, the desired function onset time can be adjusted using the determined discrepancy and the determined correction factor. The adjusted function onset time can then be used to coordinate the operations of the tools.

As stated above, it is desired to synchronize slave clocks to a reference master clock with minimum communication overhead between systems using these clocks. One could then preferably coordinate the action and/or response of several downhole devices. One could also use such synchronized clocks in distributed measurement systems, in which some devices generate an excitation signal, and others receive and process the transmitted signal. Distributing the parts of a measurement system allows for greater transmitter-receiver spacing, which is useful for increasing the depth of investigation.

Figure 12:
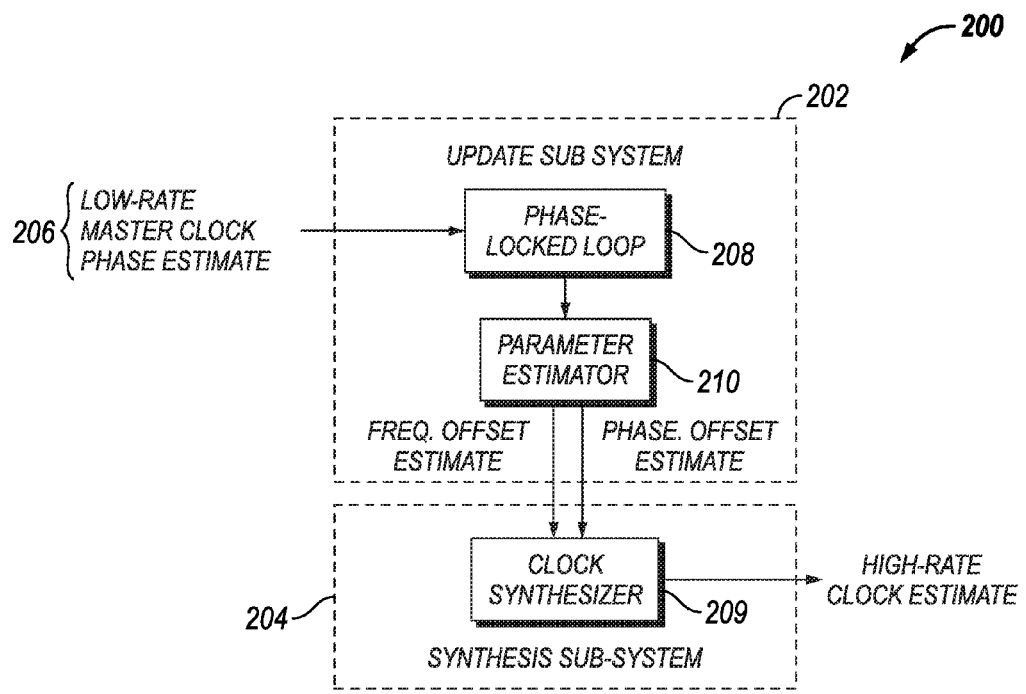
FIG. 12 schematically represents an embodiment of a disciplined clock system, in accordance with the present disclosure.

FIG. 12 illustrates one embodiment of a system, referred to herein as a disciplined clock system 200, constructed in accordance with this disclosure. The disciplined clock system 200 comprises an update subsystem 202 and a synthesis subsystem 204. The update subsystem 202 operates at an update rate, based on the master clock (MC) phase estimates, while the synthesis system 204 operates at a higher rate, the synthesis rate. The disciplined clock system 200 may also include, either as an integrated or separate component, an MC clock phase estimator 206 (represented as an input parameter in FIG. 12).

Update subsystem 202 comprises a phase-locked loop (PLL) device 208 and a parameter estimator 210. Update subsystem 202 tracks and provides updated estimates of both the phase and frequency offsets each time it receives an update from the MC phase estimator 206. Synthesis subsystem 204 comprises a clock synthesizer 209 that produces a clock signal based on those phase and frequency estimates.

For purposes of illustration and ease of discussion, we focus herein on the problem of how to synthesize a disciplined clock system. Consider two clocks: a master or reference clock (MC), and a slave clock (SC). Assume those two clocks are located on two different devices, a master clock device (MCD) and a slave control device SCD, respectively. The SCD receives updates from the MCD at certain intervals, and attempts to control the slave clock so as to be as close as possible to the master clock. From the perspective of the SCD, the master clock is a noisy clock that needs to be tracked.

One possible approach to clock synchronization is to sample the MCD clock phase and broadcast it to the SCD at the clock frequency or higher. However, such an approach requires significant communication overhead. Therefore, preferably, clock information is sent at a rate much slower than the clock frequency. In an existing tool, referred to herein as a basis for comparison, the clock frequency is 12 MHz and it has been chosen that the rate at which the MCD transmits time information to the SCD(s) is once every 5.5 seconds. This period is known to both the MCD and the SCD, hence there is no need to send an explicit time stamp.

Figure 13A:
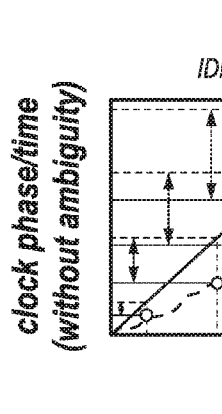
FIGS. 13A and 13B are plots comparing a noisy clock, an ideal clock, and a slave clock, in accordance with the present disclosure.
Figure 13B:
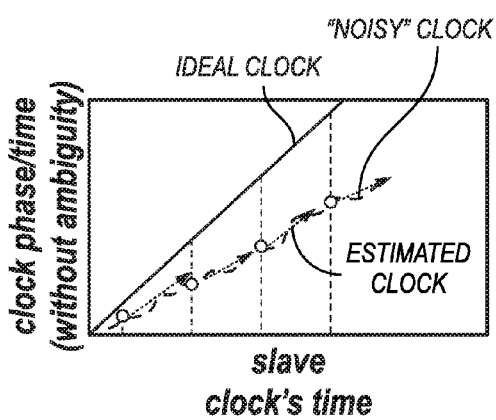

An exemplary operation scheme for the disciplined clock system 200 is illustrated in FIGS. 13A and 13B. The open circles ("dots") represent times when the MCD sends a signal to the SCD such that it can estimate the MCD clock phase. If the clocks are perfectly synchronized to each other, then from the perspective of the SCD, the clock phase of the MCD looks like the "ideal clock" line. However, due to mismatch, it generally would look like the dashed line connecting the dots. In that case, the SCD must estimate and track this dashed-line process. The arrows between the dots in FIG. 13A represent the output of the synthesis subsystem 204, based on the phase and frequency estimates at each update time. In FIG. 13B, each of the solid horizontal lines from the ordinate to a dot represents a time epoch of the MCD, while the dashed horizontal lines from the ordinate to a dot represents a time epoch of the SCD. The arrows in FIG. 13B show the timing error between the two epochs.

Figure 14:
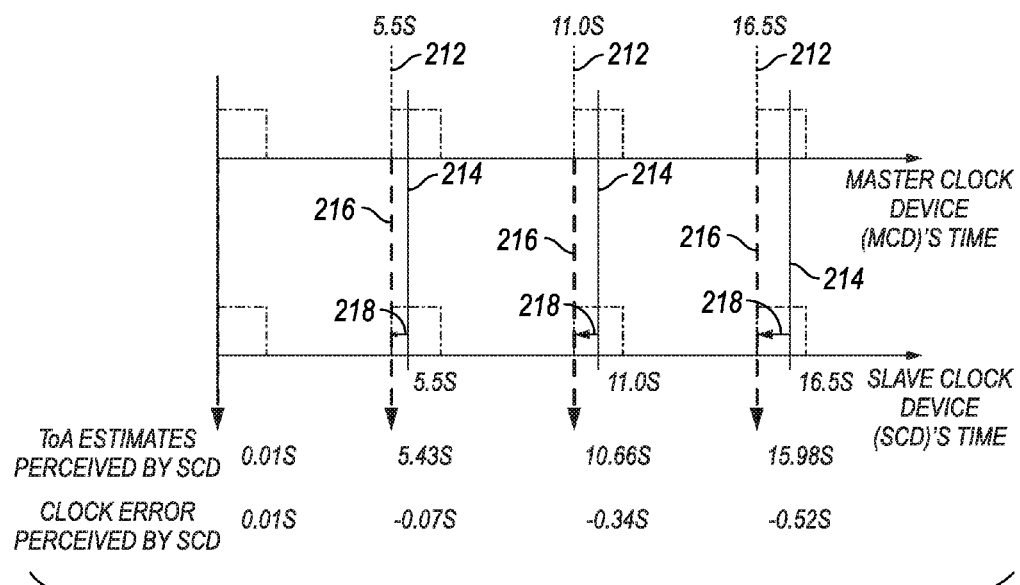
FIG. 14 schematically represents a clock-time transfer performed by periodically sending a timing signal from an MCD to an SCD, in accordance with the present disclosure.
Figure 15:
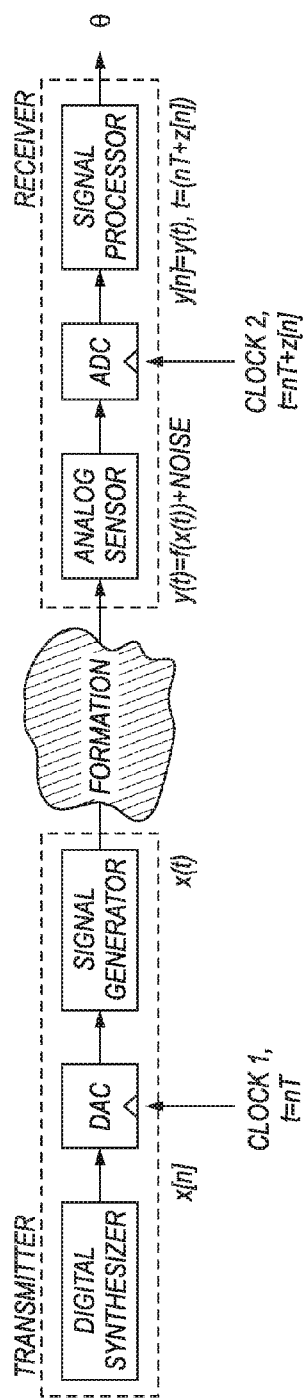
FIG. 15 schematically represents one embodiment of a synchronized measurement system, in accordance with the present disclosure.

Using the timing scheme or sequence of the referenced existing tool in the present method, and referring to FIG. 14, the MCD sends a timing signal (square block) every 5.5 seconds based on its clock (dashed lines 212). The SCDs correspondingly expect certain time(s) of arrival (TOA) of these signals according to their own clocks (solid lines 214). The actual or measured TOA are shown by the dashed lines 216. The SCDs subtract the measured TOA from their own clock to obtain the clock error, shown by the solid arrows 218. In the example shown, the clock of the SCD runs a little slower than the MCD clock, hence from the perspective of the SCD, it appears that timing signals arrive earlier as time progresses. Because the MCD communicates with the SCD only once every 5.5 seconds, the SCD can only update its estimate of the MCD clock every 5.5 seconds. Hence we refer to 1/5.5 seconds as the update rate. An example of a distributed measurement system having one transmitter and one receiver is shown schematically in FIG. 15.

Figure 16:
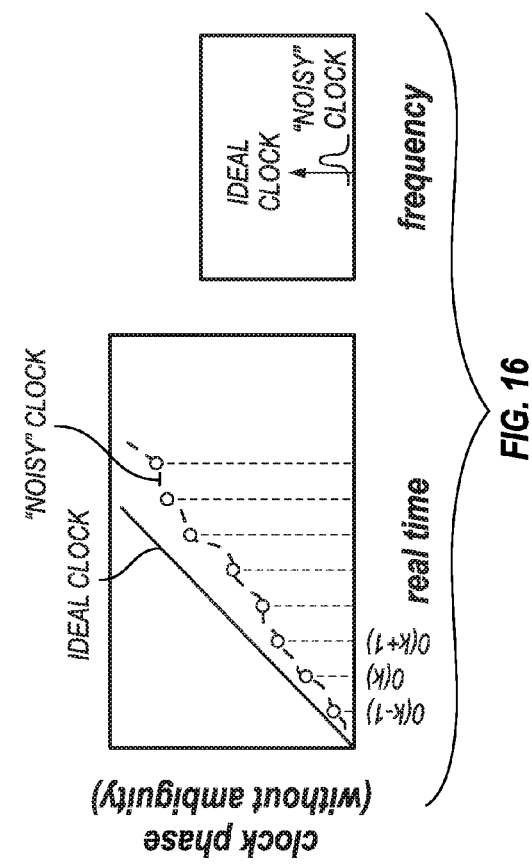
FIG. 16 is a plot illustrating a noisy clock in time and frequency, in accordance with the present disclosure.

An example of the phase output of a "noisy" clock is shown in FIG. 16. The terms phase and time are used interchangeably herein. This is permissible assuming the clock mismatch is sufficiently small that there is no phase ambiguity. While the spectrum of an ideal clock approaches a Dirac delta function in the frequency domain, the spectrum of a noisy clock is spread around the central frequency. A typical model for a noisy clock is based on a wide-sense stationary Wiener process and is a standard method taught in most communication textbooks. In most cases there two primary factors: drift (frequency mismatch) and jitter. The latter is modeled as a white Gaussian process.

One possible approach for master clock phase estimation is for the MCD to periodically transmit a signal to the SCD, based on the MCD clock. The SCD can then estimate the phase/time of arrival of the received signal to infer the phase of the MCD clock.

There is a class of methods from which one can obtain time of arrival estimates at resolutions higher than the sampling rate. They are called "super-resolution" methods. There are two classes of super-resolution methods: those based on time-domain processing, and those based on frequency-domain processing.

Time-domain based processing typically uses a fractional delay filter to compute fractional delay hypothesis values. These typically require that the receiver have good prior information on what the fractional delay is, else it has to do a search. For each hypothesis value, the estimator must compute the cross-correlation between the received signal and a (fractionally) delayed version of the pulse shape. Hence, in order to increase the resolution by 10 times, the receiver has to construct 10 correlation filters.

In contrast, frequency-domain based methods take advantage of a basic time-frequency duality. In the continuous-time domain:

$$x(t) \Leftrightarrow X(\omega)$$

$$x(t-\tau) \Leftrightarrow X(\omega)\exp(-j\omega\tau) \tag{0.1}$$

In this approach, the time delay estimation problem is converted into a model-based sinusoidal parameter estimation, and an autoregressive method is used to solve the problem. This technique can be refined by applying newer line spectrum estimation algorithms with better performance.

In the sampled domain, one algorithm that can be used is known as ESPRIT (Estimation of Subspace Parameters via Rotational Invariance Technique). Suppose one observes a sampled version of the delayed noisy signal $y[n]=\{x(t-\tau)+z(t)\}|_{t=n/f_s}$ at the SCD, sampled at rate $f_s$. Assuming that there is no frequency-domain aliasing, the discrete time Fourier transform (DTFT) is given by:

$$Y(e^{j\Omega}) = Y(\omega)|_{\omega=\Omega f_s}, \Omega \in (-\pi, +\pi) \tag{0.2}$$

Further, assuming that there is no spatial aliasing, the discrete Fourier transform (DFT) is given by:

$$Y[k] = Y(e^{j\Omega})|_{\Omega=2\pi k/N} = Y(\omega)|_{\omega=2\pi k f_s/N}, k=0,\ldots,N-1 \quad (0.3)$$

Hence, $$Y[k] = X[k]\exp(-j2\pi k f_s \tau/N) + Z[k] \quad (0.4)$$

In the above, X[k] is the DFT of the sampled version of x(t), and Z[k] represents the noise. Thus, we have mapped the desired time delay parameter τ into a complex exponential parameter.

For our problem, the algorithm can be explained very simply. Let the cross-correlation between the received signal y[n] and the sampled version of template signal x[n] be given by:

$$\begin{aligned} r[n] &= x[-n] * y[n] & \Leftrightarrow R[k] &= X^*[k]Y[k] \\ &= x[-n] * (x[n-\tau] + z[n]) & &= X^*[k](X[k]\exp(-j2\pi k f_s \tau/N) + Z[k]) \\ & & &= |X[k]|^2\exp(-j2\pi k f_s \tau/N) + X^*[k]Z[k] \end{aligned} \quad (0.5)$$

From Equations (0.4) and (0.5), we can see that in discrete-time we have: $R[k]/R[k-1] \propto \exp(-j2\pi f_s \tau/N)$ for all k. Thus a reasonable strategy for estimating τ is to compute point-wise ratios of R[k], R[k-1] to infer the quantity $\exp(-j2\pi f_s \tau/N)$, and to average the estimate. To estimate this efficiently, we form two vectors $R_1$ and $R_2$ for the first N−1 and last N−1 samples of X[k], respectively. Then we compute the right inverse of $R_1$ from $R_2$ to obtain an estimate of $\exp(-j2\pi f_s \tau/N)$. In the presence of noise, we operate on the cross-correlation instead of the direct measurement.

In summary, the algorithm is given by: (1) computing, preferably offline, the N-point DFT of the transmitted signal x[n]; (2) receiving y[n] and computing the cross-correlation r[n]=y[n]*x[−n]; (3) finding the peak, n*, of the magnitude of the cross-correlation |r[n]| (this is the integer sample delay estimate); (4) computing the DFT of r[n], n=n*, . . . ,n*+N−1, say R[k]; (5) forming $R_1$={R[0], . . . ,R[N−2]}, $R_2$={R[1], . . . , R[N−1]}; (6) computing u=$R_2$\$R_1$ (rotational invariance step); and (7) computing $$\ddot{\tau} = \left(n^* - \text{angle}(u)\frac{N}{2\pi}\right) \times \frac{1}{fs},$$

where $f_s$ is the sampling rate of the analog-to-digital converter (ADC).

It is important to note that the resolution of the computation of τ does not depend on the sampling rate $f_s$. The performance of this system is better with increasing SNR, independent of the sampling rate $f_s$. It is straightforward to extend this algorithm to include multiple arrival times. Because this frequency-domain method can resolve pulses with arrival time spacing smaller than the sampling rate, it is considered a super-resolution method.

For correlation-based TOA estimation, it is known that better performance is possible with higher signal bandwidth. The Cramer-Rao bound on time of arrival estimation is well-studied, and is valid for medium-to-high SNR. Suppose that the transmitted signal x(t) has energy E and is corrupted with additive white Gaussian noise (AWGN) having a spectral density of $N_0/2$. The bound is given by:

$$\text{var}(\ddot{\tau}) \geq \frac{1}{\frac{E}{N_0/2}F^2}, \quad (0.6)$$

where $F^2$ is the mean-square bandwidth of the signal. Hence, for the same signal-to-noise ratio, wider mean-square bandwidth means better performance.

However, the Cramer-Rao bound is not valid for low SNR cases, or for signals with poor autocorrelation. One example is a signal having many false correlation peaks. One could then use, for example, the Ziv-Zakai bound, which considers the probability of mistaking the correct peak for an incorrect one.

One possible choice that gives good TOA performance is a spread spectrum signal, which is a sequence of pulses modulated using a pseudorandom sequence. It has the advantage of having both a narrow autocorrelation with no ambiguous peaks (and by duality, a large bandwidth) and a small peak-to-average ratio.

$$x(t) = \sum_{\ell=0}^{L-1} a_\ell p(t - \ell T)$$

We choose the sequence $\{a_\ell\}$ to be a pseudorandom sequence such as an M-sequence. The rate R=1/T is called the symbol or chip rate. Together with the pulse shape, it determines the bandwidth of the signal.

Figure 17:
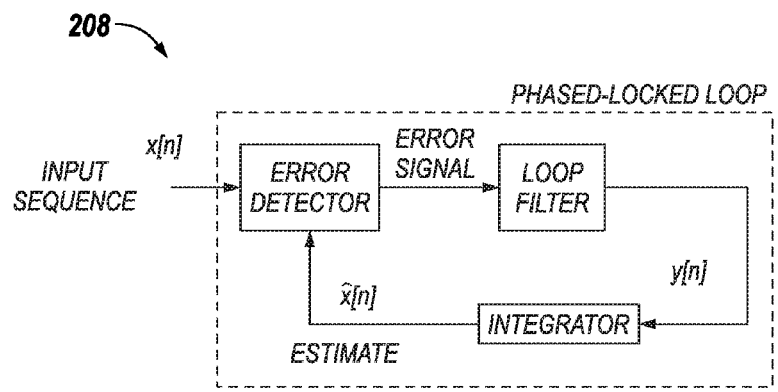
FIG. 17 schematically represents a functional diagram of one embodiment of a phase-locked loop, in accordance with the present disclosure.

The phase-locked loop (PLL) 208 (see FIG. 17) preferably is able to contend with both drift and jitter. Thus, it is preferably at least a second-order PLL. Design and analysis of a PLL is standard in most communication textbooks. A second order PLL is described as follows. Let x[n] be the input sequence. The loop filter can be chosen to have the following transfer function:

$$y[n] = K_p x[n] + \sum_{m=-\infty}^{n} K_i x[m] \quad (0.7)$$

Since the phase estimate ẍ[n] is the output of an integrator that takes y[n] as its input, then y[n] is the instantaneous frequency offset estimate. The parameters $K_p$ and $K_i$ can be chosen according to the desired damping factor and the expected frequency offset that is to be tracked. Those parameters can be tuned to trade off between tracking speed, damping factor, and variance at the output.

Going back to the system shown in FIG. 14, the timing error is chosen to be the input sequence to the PLL 208. Then ẍ[n] will be an estimate of the timing deviation and y[n] will be an estimate of the frequency deviation, normalized to the update rate (since its sampling period is 5.5 seconds).

In summary, two outputs from the PLL 208 are obtained: (1) the phase estimate ẍ[n]; and (2) the frequency estimate y[n]. These estimates are updated once per reception of timing signal from the MCD, and the updated estimates are used to synthesize a clock signal at the SCD.

The purpose of the parameter estimator is to obtain a reliable estimate of both the frequency and phase offsets that can be used to synthesize a slave clock signal to maintain tracking until the next update instance. From the output of the PLL 208, one obtains a sequence of phase estimates after filtering. The derivative of this sequence (which is the output of the loop filter) gives a frequency offset estimate. Alternatively, as mentioned before, the frequency estimate can be directly obtained from the output of the loop filter prior to passing it into the integrator. Based on estimates of frequency and phase offsets, the clock synthesizer 209 will add corrections to the local slave clock continuously or at the synthesis rate.

One possible approach for clock phase estimation is for the MCD to periodically transmit a signal to the SCD, based on the MC. The SCD can then estimate the phase/time of arrival of the received signal to infer the phase/time of the MC. Based on basic estimation theory, the signal may be chosen to be a spread spectrum signal, as described above:

$$x(t) = \sum_{k=0}^{K-1} a_k p(t - kT)$$

Again, the sequence $a_k$ is chosen to be a pseudorandom sequence. For definiteness, we limit the span of the overall signal to 20 ms, though this is not meant to be a limitation on the method. K and T are chosen accordingly, and as before, the rate $R=1/T$, is the symbol or chip rate and it, along with the pulse width, determines the bandwidth of the signal.

Figure 18:
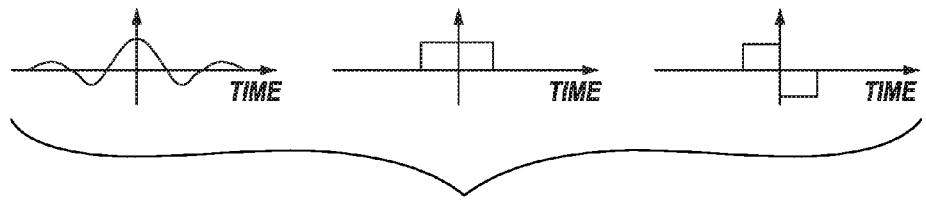
FIG. 18 is a set of graphs showing various pulse shapes used in testing, in accordance with the present disclosure.
Figure 19:
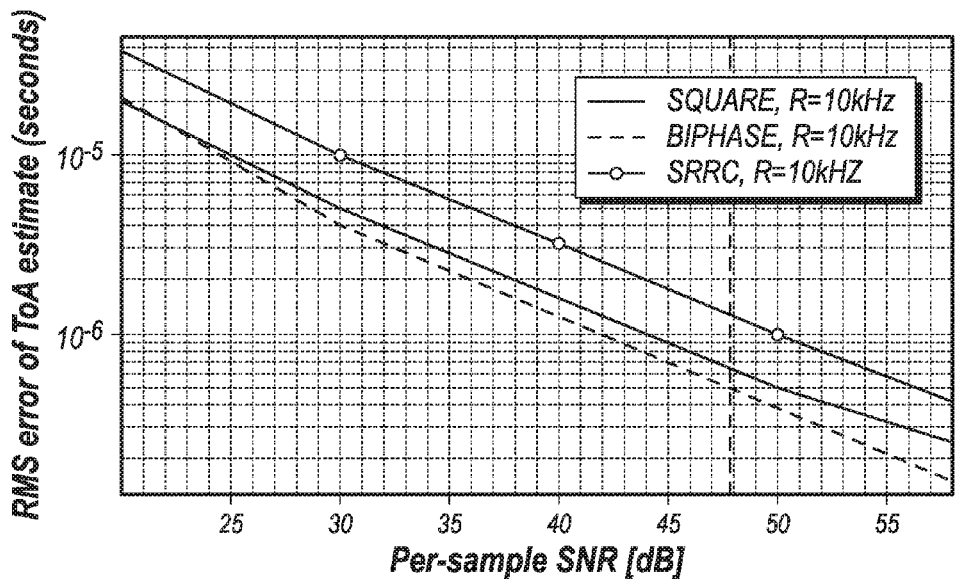
FIG. 19 is a plot of results using a super-resolution method for different pulse shapes, in accordance with the present disclosure.

Simulation results of the super-resolution method based on ESPRIT are presented. The system makes a coarse estimate based on correlation peak-finding and then uses ESPRIT on a windowed signal around the peak. Three pulse shapes (see FIG. 18) are compared, and ordered in FIG. 18 according to their bandwidths: (1) a root raised-cosine pulse (RMS bandwidth at R=10 kHz is 18.7 kHz); (2) a square pulse (RMS bandwidth at R=10 kHz is 97 kHz); and (3) a biphase pulse (RMS bandwidth at R=10 kHz is 181 kHz). The latter two are two-level pulses that can be generated using a simple 1-bit DAC. From FIG. 19, it can be seen that the performance scaling law predicted by Equation (0.6) is achieved. Going from R=10 kHz to R=20 kHz gives a 3 dB improvement, and going from R=10 kHz to R=50 kHz gives a 15 dB improvement. Further, pulses with higher time-bandwidth products have better performance than those with lower time-bandwidth products. As used herein, the per-sample SNR is defined to be the ratio between the sampled signal energy and the per-sample AWGN variance, as given by the sampling rate.

Note that the biphase pulse is nothing but a square pulse with a sign change within it. Further inspection reveals that at high SNR, the performance of a square pulse at a 20 kHz pulse rate is nearly identical to that of a biphase pulse at 10 kHz. Further, it should be noted that in all cases, the performance of the instant method is within 2 or 3 times the bound of Equation (0.6), which is re-computed for each choice of pulse shape and symbol rate R.

Although the above discussion focuses on baseband pulses, it is easy to convert the system to its passband equivalent. Further, moving to the passband representation will improve the performance as predicted in equation (0.6), since the mean-square bandwidth of the signal will be improved.

Figure 20:
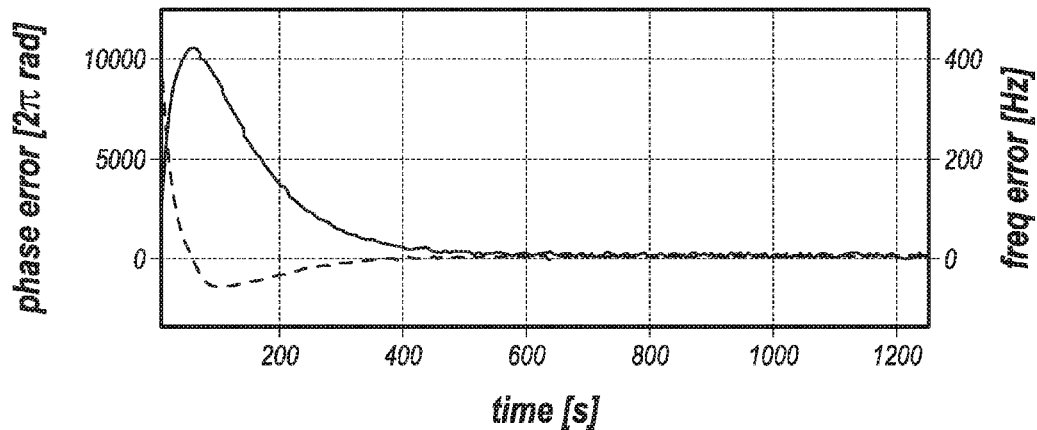
FIG. 20 is a plot showing phase and frequency error traces of the update subsystem for one embodiment, in accordance with the present disclosure.
Figure 21:
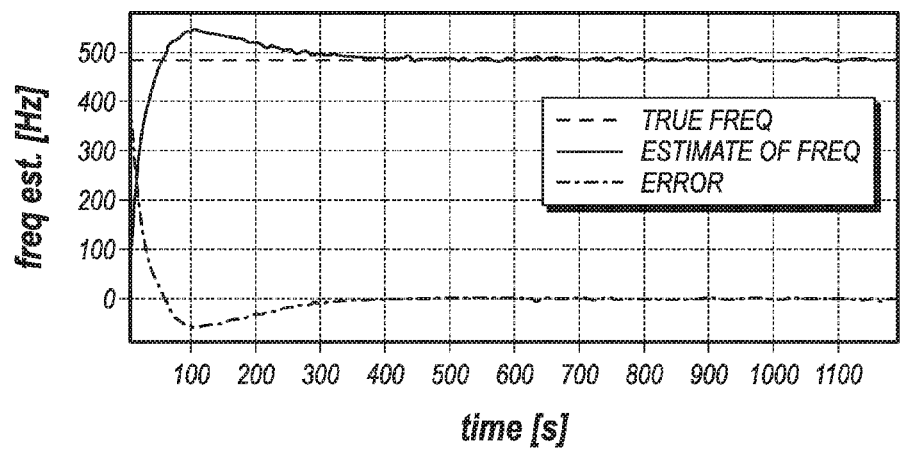
FIG. 21 is a plot showing frequency estimate and frequency error of the update subsystem for one embodiment, in accordance with the present disclosure.

Recalling again the timing scheme of the referenced existing tool, the master and slave clock frequencies are 12 MHz, with accuracy guaranteed up to 40 ppm. That means that the maximum offset is 480 Hz. The update rate is, again, once every 5.5 seconds. The performance analysis on the update subsystem 202 of the present disclosure is easy to carry to the synthesis subsystem 204 since its behavior is completely determined by the update subsystem 202. Exemplary error outputs are shown in FIGS. 20 and 21, using the timing scheme of the previously referenced existing tool. As stated before, parameters can be tuned to trade off between tracking speed, damping factor, and variance at the output, though that was not done in those examples. The case shown is the absolute worst case. It assumes that the clocks are immediately mismatched by 480 Hz. In reality, clocks are very accurate at room temperature and their mismatch drifts slowly as temperature increases.

The above analyses assume that we are able to obtain accurate estimates of the MC phase. In reality, that is not generally the case. One may be limited by several factors, including jitter, the effect on the signal that relays phase of noise on the communication bus, and the front-end parameters of the SCD (e.g., sampling rate, noise floor, etc.). However, one can still do communication-style link budget analysis.

Assume that the jitter in phase estimation is the sum of jitter due to the MC jitter and the estimation error due to noise afflicting the signal relaying the phase, sent from the MCD to the SCD. To estimate time of arrival, one should consider the time of arrival estimation in the presence of AWGN. Assume that the noise density on the bus is limited to 200 μV/RtHz. For the timing signal, we assume a worst-case of 1 Vpp (peak-to-peak) with a duration of 20 ms. Hence, the SNR is approximately 46 dB.

Based on the bound of Equation (0.6), we can derive that, in this case, it is possible to obtain a root-mean-square (RMS) time delay estimation error as low as 700 ns. However, this bound is derived for a continuous-time estimator and ignores the issue of sampling rate. Further, the transfer function of the propagation channel itself has been ignored.

In the present implementation, the sampling rate of the SCD timing signal receiver is 500 kS/s. This means that the sampling interval is 2 μs. Of course, the ADC itself has some jitter. Since the sampling interval value is already very close to the RMS of the time of arrival estimation error, it is likely that an increase in sampling rate would be beneficial. This also means that if the signal shape is further optimized (in terms of mean-square bandwidth), then the sampling rate of the system is preferably increased so that it does not become the bottleneck.

Figure 22:
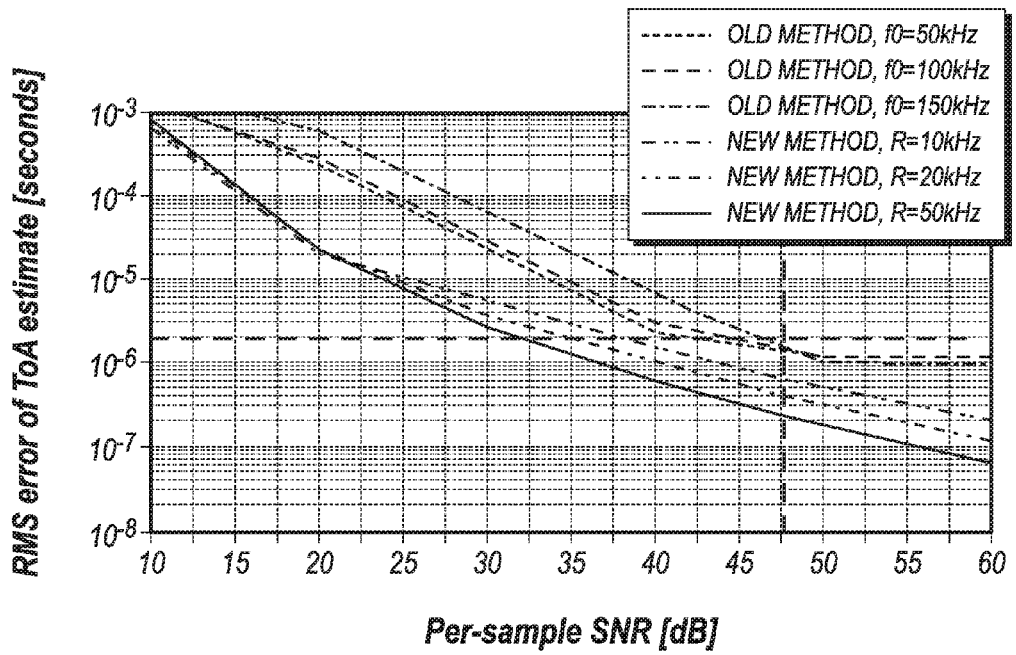
FIG. 22 is a plot of simulation results comparing an "old" method with the "new" method, in accordance with the present disclosure.

Simulation results using the referenced prior art method, i.e., based on carrier phase, are compared with simulation results from an embodiment of the present method, and shown in FIG. 22. The prior art method sends a single tone signal at 100 kHz, and requires a high SNR to get good results. At lower SNR values, the higher choice of carrier frequency $f_0$ gives the worst performance due to the aliasing effect from carrier phase ambiguity. The cutoff SNR below which phase ambiguity plays a role is at approximately 50 dB for $f_0$=150 kHz and at approximately 40 dB for $f_0$=50 kHz or 100 kHz. By comparison, the new signaling choices do not suffer the phase ambiguity problem until one approaches the 20-30 dB regime. This means the new signaling choices are more robust to noise, as well as being naturally more robust to the single-tone interference that, due to motor noise, is prevalent in the BHA. Further, improving the prior art peak-finding method using the carrier phase only has marginal improvement beyond the sampling period of the ADC, as shown by the horizontal line near the center of FIG. 22.

By comparison, the results from the embodiment of the present method is monotonically better with higher bandwidth or rate. That means that if one requires higher performance, there are parameters that one can exploit to improve the performance. Although the RMS bandwidth of the signal of the embodiment of the present method is lower than that used by the prior art method, this can be remedied by choosing passband-modulated equivalents with minimal change to the estimation algorithm.

Particular deficiencies of the prior art method include: (1) even though the RMS bandwidth of the signal is larger than that of the embodiment of the present method, the poor choice of signal means that the prior art method suffers from phase ambiguity; and (2) the RMS bandwidth of the signal is also wasted due to processing mostly in the time domain. Because the present estimation technique is independent of sampling rate, it can be applied to any signal, such as the signal of the prior art method. However, the estimation will still suffer from phase ambiguity.

Figure 23:
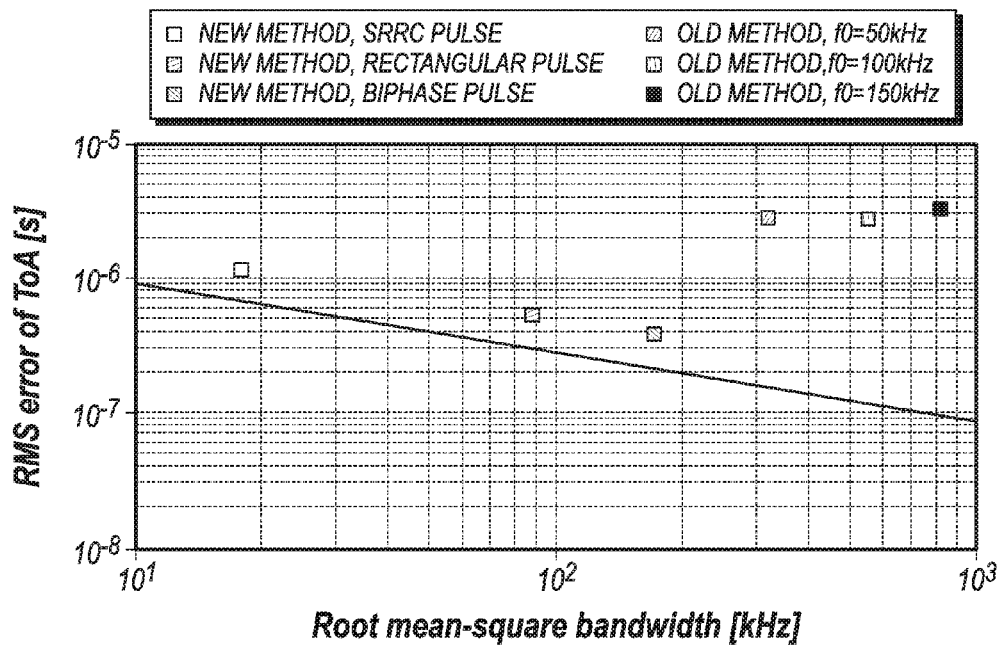
FIG. 23 is a plot showing the performance of different methods and signals versus the Cramer-Rao bound, in accordance with the present disclosure.

To better illustrate, another comparison is shown in FIG. 23, in which the RMS errors for the present (i.e., "new") and prior (i.e., "old") techniques are plotted versus different RMS bandwidth of different signals. These are also compared with the Cramer-Rao bound (downwardly sloping line). Clearly, the results using an embodiment of the present method are shown to be close to the bound, whereas the old (i.e., prior art) method and associated signals are all very far from the bound.

To further refine the measurement, one can add the time of arrival estimation error and the phase noise from the MCD. Based on the clock specification, which in our example is 40 ppm at 12 MHz, the time uncertainty from one transmission of the timing signal to the next (5.5 s) is 40 ppm×5.5 s=220 μs. The question is then whether most of this is jitter or drift. For now, we assume that the jitter from the MC is lower than the jitter from the TOA.

Figure 24:
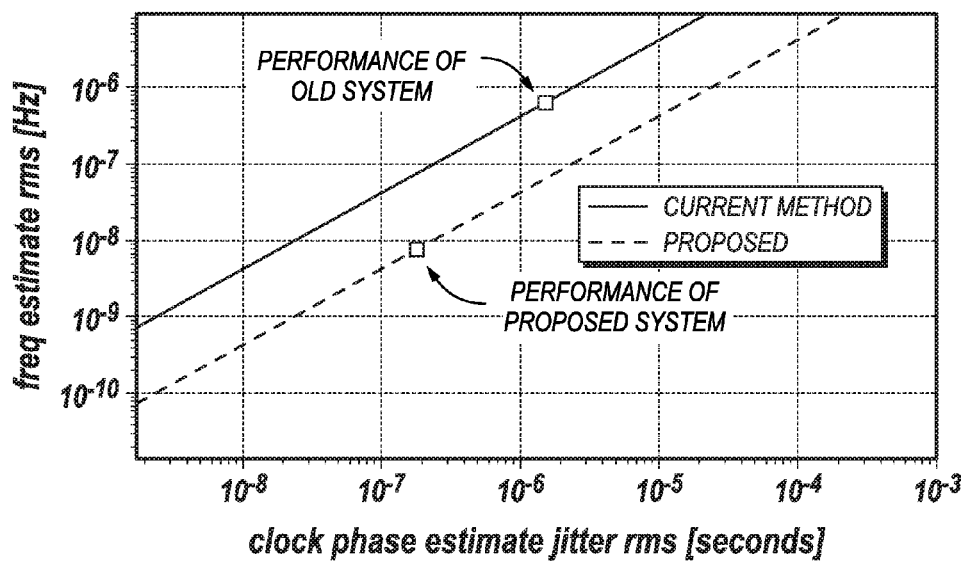
FIG. 24 is a plot comparing the frequency estimates from an "old" method and a phase-locked loop method, in accordance with the present disclosure.

Having derived the jitter in phase estimation, we now investigate the effect on the phase and frequency estimate by linearized analysis of the PLL. We know that the loop bandwidth of the PLL has to be at least wide enough to track the frequency offset (in this case, it is 480 Hz). The referenced prior art method computes the difference between phase estimates to obtain a frequency estimate, followed by a median filter of length 5. The median filter is nonlinear, hence resort is made to simple simulation to evaluate the performance of phase tracking. This is shown in FIG. 24. Even if the old TOA method is used, the performance is approximately 30 dB better with the PLL. This is not surprising considering the prior art method only does differential estimation. However, if we switch to the new TOA method, then we obtain even more performance gain. As shown, the frequency mismatch can be reduced from just below 1 μHz to below 10 nHz. This is an order of magnitude improvement in the clock mismatch RMS.

Thus, the present disclosure has disclosed a system and method for clock synchronization between a Master Clock Device (MCD) and one or several Slave Clock Devices (SCDs), where the goal is for the SCDs to be able to produce the clock of the MCD with high accuracy but with minimal communication overhead. The disclosed method can include one or more of the following aspects: (1) a new timing signal; (2) a new time of arrival estimation technique; and (3) a new clock tracking technique. It was shown that careful choice of the timing signal can improve the performance and consistency of a time propagation system. The new time of arrival estimation technique is an improvement over prior art methods, and works for any choice of timing signal, though it will not cure the poor correlation properties and phase ambiguities of the "old" timing signals. Finally, the present clock tracking technique is superior to prior art techniques, regardless of how the timing signal and/or the time of arrival estimation is done. FIG. 24 shows that, for a particular embodiment of the present method, the RMS error of frequency estimation can be lowered by 100 times compared to a particular prior art system.

The method described in this document can be used to synchronize several devices together. This includes multiple subs in the same BHA, or devices across several shuttles, or generally devices in several locations where there is limited communication between them. The timing signaling scheme can also be changed from sending a signal at regular, predefined intervals to sending signals occasionally, but with a time stamp. In that case, the PLL is preferably changed from a regular PLL to a gated PLL, and the analysis is slightly modified accordingly.

As stated above, when measuring downhole formation characteristics, sometimes transmitters and receivers are widely separated in a tool string. Signals are often sent into the formation by one or more transmitters, and then received by one or more receivers at particular distances from the transmitter(s). The received signal is analyzed to attempt to infer formation characteristics.

One important measurement is the time from when a transmitter is fired until that signal is received. Measuring the delay between a transmitter firing and the reception of the signal at a receiver allows the signal velocity through the formation to be measured, from which one can infer formation characteristics. In some cases, it is preferable for this delay to be measured to an accuracy of better than 30 ns.

Further reiterating, when transmitters and receivers are not too widely spaced, it is possible for the receivers to know the time of the transmitter firing through many conventional mechanisms. One such mechanism is for the same oscillator signal to be used for the transmitters and receivers, thus allowing the clocks to remain synchronized. Another mechanism is each transmitter can send a signal through a dedicated wire to notify receivers that they have fired. However, with longer spacings between transmitters and receivers, those conventional approaches may not work. It may not be possible to run a dedicated wire through this distance, nor can the same oscillator signal be made available to all transmitters and receivers.

One approach to overcome these limitations is to periodically send a sine wave as a synchronization signal through a common tool bus. For example, a 10 millisecond burst of a 100 KHz signal might be sent every 5 seconds as a synchronization signal. However, this approach has some difficulties. One problem is that sine waves can correlate every ±2π radians, with very little difference between the summation of the proper correlation and the ±2π offset correlation. For the example above, this difference is only about 0.01%, so fairly small amounts of noise can lead to an offset correlation. When an offset correlation occurs, this leads to a timing error of 10 μs, far in excess of the 30 ns accuracy desired. Another problem is that sine waves are strongly affected by tone noise near the frequency used. When such noise occurs, the signal can fail to correlate. What is desired is robust timing that strongly resists miscorrelation, and is not subject to failure from tone noise.

Instead of transmitting a single tone as a timing signal, one can send a wideband timing signal with strong correlation properties. The strong correlation properties can be ensured by using a baseband binary code that forms a maximum length pseudorandom (PN) sequence. The wideband signal is received and correlated with the reference transmitted signal to obtain an accurate arrival time. Such robust and accurate synchronization allows for extremely accurate recovery of timing information, even with high levels of noise and with channels that have multiple phase inversions. There is no point of possible miscorrelation within the PN timing signal and the wideband signal provides resistance to tone noise at any frequency. That is, the coding gain from the correlation of the PN sequence provide effective signal amplification, allowing resistance to extremely high levels of Gaussian or tone noise.

Figure 25:
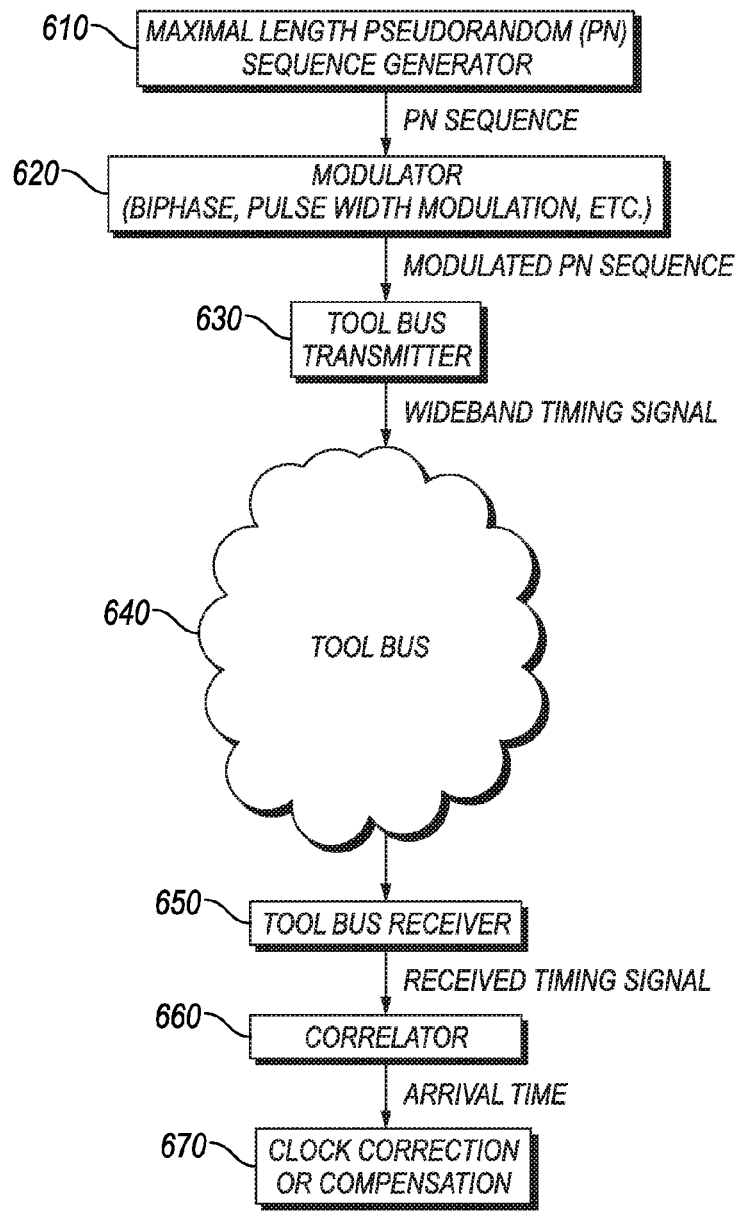
FIG. 25 is a flowchart showing steps in one embodiment, in accordance with the present disclosure.

Referring to FIG. 25, a maximal length pseudorandom (PN) sequence generator 610 produces a PN sequence of the desired length. A longer sequence can provide more coding gain and better correlation, but it also takes more time to transmit. Typical lengths would be 512 to 4096 bits, with longer or shorter lengths preferable in various situations.

This binary PN sequence is sent to a modulator 620. The modulator 620 modulates the PN sequence to produce a modulated PN sequence. Typical modulation might include pulse width modulation (PWM), biphase modulation, BPSK modulation, or a variety of other modulation techniques which produce wideband signals. In many cases, the best modulation choice may depend upon the characteristics of the transmitter 630 and tool bus 640. The modulator 620 may also pre-emphasize the signal to compensate for the characteristics of the transmitter 630, so that the wideband reference signal transmitted though the tool bus 640 has a more or less flat frequency spectrum. Additionally, the modulator 620 could also pre-emphasize the signal based on anticipated characteristics of the tool bus 640 channel.

The transmitter 630 couples the signal from the modulator 620 to the tool bus 640. One aspect of the transmitter 630 is that the signal is put on the tool bus 640 with very specific and highly accurate timing. By predefining when the signal will be coupled to the tool bus 640, a receiver 650 can know precisely when the local transmitter 630 put the signal on the bus 640, so that synchronization can be more precise. Tool bus 640 interacts with the wideband timing signal coupled by the transmitter 630, delivering a signal that is affected by this interaction to the receiver 650.

The receiver 650 is coupled to the tool bus 640 to retrieve the signal at the receiver 650. In the receiver 650, the signal is typically amplified, passed through anti-aliasing filters, and is sampled at a rate that is at least twice as high as the maximum frequency in the timing signal. The resulting received timing signal is the passed to the correlator 660, typically as an array of digital samples.

The correlator 660 typically has an array of digital samples stored that corresponds to the wideband timing signal generated by the transmitter 630. This array is correlated with the received timing signal array from the receiver 650. Because of the strong correlation strength of the PN sequence, a good correlation can be made regardless of the channel characteristics of the tool bus 640. This correlation provides a precise arrival time for the timing signal. This arrival time may be used by the clock correction or clock compensation unit 670.

If clock correction unit 670 implements a clock correction, the local clock is adjusted using the arrival time and the predefined value for when the timing signal originated from the transmitter 630 to set the local receiver clock to a value corresponding to the estimated value of the transmitter clock. A second order timing loop can track frequency drift, so that the clock frequency can be corrected between timing synchronization points. If clock compensation unit 670 implements clock compensation, the local clock is left free-running and is not adjusted. Instead, compensation factors are calculated which can be used with the local clock to calculate the estimated value of the transmitter clock whenever this value is needed. Because the second order timing loop can track frequency drift, the clock compensation factors can be adjusted between timing synchronization points to reflect the frequency difference. Regardless of whether clock compensation or clock correction is used, the result is that the receiver 650 can accurately estimate the value of the transmitter clock at any time.

Accurate timing allows, among other things, the delay between widely separated tool measurements to be accurately determined. If a transmitter sends a signal into a formation at a known local time, when a receiver detects the signal, it can determine what the time on the transmitter clock was at the time the signal was detected by the receiver. By subtracting this time from the known time when the transmitter originates the signal, the delay of the signal through the formation can be calculated. This allows widely separated tool measurements to still have accurate formation delay measurements.

A prototype apparatus has been built and the disclosed method implemented using a 1024 bit maximal length PN sequence using biphase modulation at a 62.5 KHz symbol rate. This prototype implementation was tested in the laboratory. When Gaussian or tone noise that was 2.5 times larger than the signal was injected, timing was still recovered with less than 2 ns standard deviation. When the timing signal was tested with a worst case tool bus, the timing was recovered with less than 2.2 ns standard deviation. Thus, this apparatus and method has been proven in the laboratory to be accurate and robust.

Once again, a thesis of this disclosure is that many situations require measuring the phase of a received signal very accurately. For example, using such phase measurement to determine the delay between transmission and reception of a measurement signal allows one to determine the propagation velocity of the channel being measured. The accurately measured phase may also be used to synchronize clocks between various systems. In addition, there are many other situations where accurate phase measurement is needed.

As described above, a highly correlated signal such as a maximal length PN sequence is preferably used when accurate measurement of received phase is needed. For such a signal, if the approximate signal to be received is known in advance, a reference signal can be stored in the receiver and correlated with the received signal. The point of maximum correlation corresponds to the phase of the received signal.

This point of correlation has a symbol phase resolution based on the sampling rate and the symbol rate. If the signal is sampled at eight times the symbol rate, then each sample corresponds to ⅛ of 360 degrees, or 45 degrees of the symbol rate. If a greater phase accuracy is needed, then the sampling rate per symbol could be increased. There are, however, often limitations restricting sampling rate, such as maximum speed of an A/D converter. These limitations can restrict the maximum phase accuracy available from increasing the sampling rate. Other techniques such as zero-crossing detection, curve fitting, etc. can resolve phase below the sampling rate. However, these techniques either have accuracy limitations (especially when noise exists) or very high computational requirements. What is desired is a method to resolve the phase with a resolution at least 50 times greater than the sampling rate, and having fairly low computational requirements.

To that end, one may use a dual correlation (i.e., two correlations) of a signal with strong correlation properties. The strong correlation properties can be ensured by using a baseband binary code that forms a maximum length pseudo-random (PN) sequence, as described above.

As an illustrative embodiment, a first correlation is the typical correlation of the received signal with a stored reference signal. However, instead of just using the point of highest correlation, nearby correlation points are also used. For example, three points on either side of the maximum point could be used, selecting a total of seven points. The selected points near the maximum correlation are used for a second correlation. They are correlated with an array of correlation points that correspond to various correlation phases. The length of this array could correspond to the amount of subsample resolution needed. For example, if a phase resolution 50 times greater than the sampling rate is needed, then an array of 50 correlation points corresponding to 50 correlation subphases can be used. Alternatively, a smaller array can be used, with interpolation used to find the subphase between two table points. This approach allows for lower computational cost compared to those required for curve fitting. Extremely accurate phase recovery is possible, and such accurate phase recovery may enable applications that might not otherwise be possible.

Figure 26:
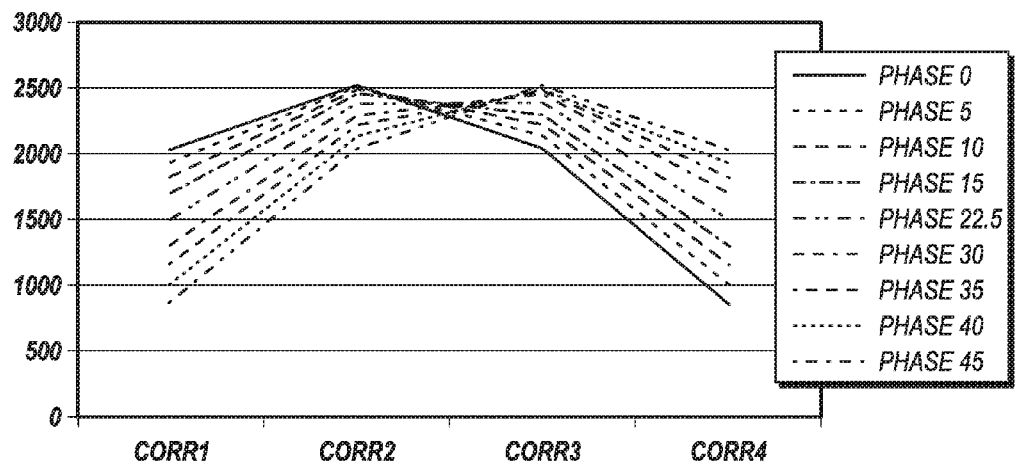
FIG. 26 is a plot showing correlation values for various phase offsets, in accordance with the present disclosure.

FIG. 26 shows a correlation of a PN sequence that was sampled at a rate of eight samples per symbol. Note the each phase has a unique curve, based on the center correlation values, and the plots are symmetrical around the 22.5 degree phase point. The symmetry around the 22.5 degree point is based on the sampling rate of eight samples per symbol, so each sample corresponds to a 45 degree phase. As the phase passes through the 22.5 degree point, the maximum correlation value moves to the next sample. At the 22.5 degree point, the correlation points are symmetrical.

When correlating each received correlation midpoint value against reference correlation midpoint values for each phase, the correlation with the highest value corresponds to the closest received phase. Because the correlation phases are symmetric about the 22.5 degree point, it is only necessary to store correlation values between 0 and 22.5 degrees. Correlation values between 22.5 degrees and 45 degrees are easily found based on the symmetry.

Figure 27:
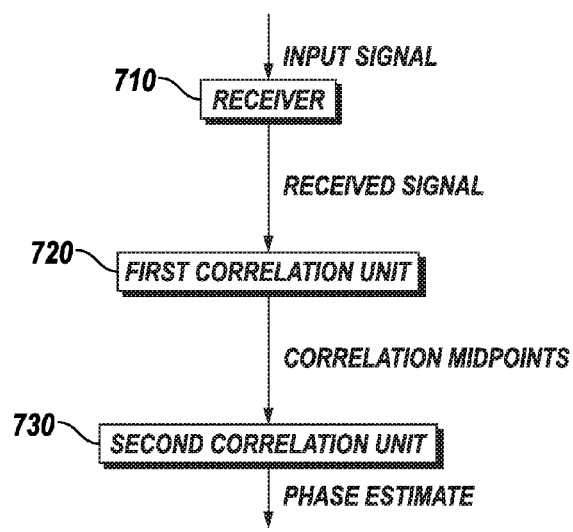
FIG. 27 is a flowchart showing steps in one embodiment, in accordance with the present disclosure.

An input signal (see FIG. 27) for which one wishes to determine the phase is preferably a signal with high correlation strength such as a maximal length PN sequence. In the receiver 710, the input signal is typically amplified, passed through anti-aliasing filters, and is sampled at a rate that is at least twice as high as the maximum frequency in the input signal. Preferably, a hardware analog high-pass filter is also used prior to the anti-aliasing filers to remove the low-frequency noise and DC offset. The resulting received signal is passed to a first correlation unit 720, typically as an array of digital samples. The first correlation unit 720 typically has an array of digital samples stored that corresponds to the expected received signal. Because of the strong correlation strength of the PN sequence, if a PN sequence is used as the input signal, then a good correlation can be made even if the input signal is highly noisy or distorted. Signals with less correlation strength will be less resistant to noise and distortion.

To minimize processing time, the first correlation can be done in two steps. A coarse correlation can be done using only a subset of the stored array of digital samples that corresponds to the expected received signal. Once the approximate correlation point is determined, a fine correlation is performed to find the correlation midpoints for the first correlation. The first correlation unit 720 determines the point of highest correlation and the nearby points, referred to herein as the correlation midpoints. Those correlation midpoints are passed to a second correlation unit 730.

The second correlation unit 730 has an array of correlation reference points stored, with each row of the array corresponding to a particular phase. Depending upon the phase resolution desired and computation time available, this array may typically have between ten and 100 rows corresponding to various phases. The correlation midpoints are correlated with the stored array of correlation reference points. This constitutes the second of the two correlations. The point of highest correlation indicates the row of the array corresponding to the best phase estimate.

A curve fitting approach can be used for peak correlation detection when higher phase resolution is needed, but a larger array of correlation reference points is impractical, due to storage space, computational power, or other considerations. To obtain high phase resolution, the three highest points of correlation for the second correlation are used. The corresponding phases are curve fitted and peak correlation detection is performed to find the best phase estimate.

A prototype apparatus was built and the method implemented using dual correlation with an adjustable array of correlation points that correspond to various correlation phases. Dual correlation using 10 to 100 reference correlation points was tested. Such testing was done in a laboratory using input signals that were sent through bus conditions with high signal distortion. In addition, Gaussian and tone noise was added to the input signals. Even with very high distortion and noise, the dual correlation process found the input phase very accurately, with a standard deviation of about 0.1 degrees.

To reduce the demodulation error caused by hardware effects, digital captures of actual received signals may be used to generate the demodulation reference vectors. By using the actual signals to generate the reference vectors, the reference vectors can better match the actual hardware implementation.

It should be appreciated that while the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method comprising:
providing a disciplined clock system comprising an update subsystem and a synthesis subsystem, wherein the update subsystem operates at an update rate and the synthesis subsystem operates at a synthesis rate that is faster than the update rate;
providing a first clock phase estimate to the update subsystem;
determining a frequency offset estimate and a phase offset estimate using the first clock phase estimate and the update subsystem, wherein determining the phase offset comprises estimating the time of arrival of a signal;
providing the frequency offset estimate and the phase offset estimate to the synthesis subsystem; and
using the synthesis subsystem to determine a clock signal based at least partially upon the frequency offset estimate and the phase offset estimate.

2. The method of claim 1, wherein estimating the time of arrival for the signal comprises using a super-resolution method.

3. The method of claim 1, wherein the signal has a strong correlation property.

4. The method of claim 1, wherein the signal comprises a wideband signal or a passband-equivalent of the wideband signal.

5. The method of claim 1, wherein the signal comprises a spread spectrum signal, a chirp signal, a pseudo-random signal, or a passband-equivalent of those signals.

6. The method of claim 1, wherein determining the frequency offset estimate and the phase offset estimate comprises using a phase-locked loop.

7. The method of claim 1, further comprising tracking a mismatch between the separate clocks.

8. The method of claim 1, further comprising reproducing a first clock at a second clock using the synthesis subsystem.

9. The method of claim 1, further comprising compensating for a signal propagation time through a bottomhole assembly using the clock signal.

10. The method of claim 1, wherein the disciplined clock system further comprises a master clock phase estimator.

11. The method of claim 10, wherein the master clock phase estimator provides the first clock phase estimate.

12. The method of claim 1, wherein the signal comprises a signal relative to a master clock reference frame.

13. The method of claim 12, wherein determining the phase offset additionally comprises using a correction factor and a discrepancy between a master clock and a local clock.

14. The method of claim 13, wherein the correction factor is determined between the master clock and the local clock using a start time of a pulse determined by the master clock and a transformed start time of a pulse from the local clock.

15. The method of claim 13, wherein the discrepancy is determined between the master clock and the local clock using an expected start time of a pulse sequence determined from the master clock and a transformed start time of a pulse sequence determined from the local clock.

16. An apparatus comprising:
a disciplined clock system having:
an update subsystem that operates at a first rate and is configured to receive a clock phase estimate signal and output a frequency offset estimate and a phase offset estimate based on the received clock phase estimate signal, wherein the phase offset estimate is at least partially determined by estimating the time of arrival of a signal; and
a synthesis subsystem that operates at a second rate that is greater than the first rate and is configured to receive the frequency offset estimate and the phase offset estimate and output a clock signal determined based at least partially upon the received frequency offset estimate and the received phase offset estimate.

17. The apparatus of claim 16, wherein the update subsystem comprises:
a phase-locked loop that receives the clock phase estimate signal; and
parameter estimator logic that receives an output of the phase-locked loop and provides the frequency offset estimate and the phase offset estimate.

18. The apparatus of claim 16, wherein the synthesis subsystem comprises a clock synthesizer that receives the frequency offset estimate and the phase offset estimate and provides the clock signal.

19. The apparatus of claim 16, wherein the apparatus comprises a downhole well logging tool.

* * * * *